(12) United States Patent
Han et al.

(10) Patent No.: US 10,878,576 B2
(45) Date of Patent: Dec. 29, 2020

(54) ATLAS-BASED SEGMENTATION USING DEEP-LEARNING

(71) Applicant: Elekta, Inc., Atlanta, GA (US)

(72) Inventors: Xiao Han, Chesterfield, MO (US); Nicolette Patricia Magro, Denver, NC (US)

(73) Assignee: Elekta, Inc., Atlanta, GA (US)

( * ) Notice: Subject to any disclaimer, the term of this patent is extended or adjusted under 35 U.S.C. 154(b) by 150 days.

(21) Appl. No.: 15/896,895

(22) Filed: Feb. 14, 2018

(65) Prior Publication Data
US 2019/0251694 A1 Aug. 15, 2019

(51) Int. Cl.
*G06T 7/174* (2017.01)
*G06T 3/00* (2006.01)
(Continued)

(52) U.S. Cl.
CPC ............... *G06T 7/174* (2017.01); *G06N 3/08* (2013.01); *G06T 3/0068* (2013.01); *G06T 7/11* (2017.01); *G06T 2207/20081* (2013.01); *G06T 2207/20084* (2013.01); *G06T 2207/20128* (2013.01); *G06T 2207/30081* (2013.01); *G06T 2207/30096* (2013.01)

(58) Field of Classification Search
CPC ......... G06T 7/174; G06T 3/0068; G06T 7/11; G06T 2207/20081; G06T 2207/20084; G06T 2207/20128; G06T 2207/30081; G06T 2207/30096; G06N 3/08
See application file for complete search history.

(56) References Cited

U.S. PATENT DOCUMENTS 9,122,950 B2 9/2015 Han
2005/0251021 A1 11/2005 Kaufman et al.
(Continued)

OTHER PUBLICATIONS

Chen, Hao, et al., "Automatic Localization and Identification of Vertebrae in Spine CT via a Joint Learning Model with Deep Neural Networks", Medical Image Computing and Computer-Assisted Intervention—MICCAI 2015, LNCS 9349, (2015), 515-522.
(Continued)

*Primary Examiner* — Menatoallah Youssef
(74) *Attorney, Agent, or Firm* — Schwegman Lundberg & Woessner, P.A.; Sanjay Agrawal

(57) ABSTRACT

Techniques for enhancing image segmentation with the integration of deep learning are disclosed herein. An example method for atlas-based segmentation using deep learning includes: applying a deep learning model to a subject image to identify an anatomical feature, registering an atlas image to the subject image, using the deep learning segmentation data to improve a registration result, generating a mapped atlas, and identifying the feature in the subject image using the mapped atlas. Another example method for training and use of a trained machine learning classifier, in an atlas-based segmentation process using deep learning, includes: applying a deep learning model to an atlas image, training a machine learning model classifier using data from applying the deep learning model, estimating structure labels of areas of the subject image, and defining structure labels by combining the estimated structure labels with labels produced from atlas-based segmentation on the subject image.

26 Claims, 9 Drawing Sheets

(51) Int. Cl.
  *G06N 3/08* (2006.01)
  *G06T 7/11* (2017.01)

(56) References Cited

U.S. PATENT DOCUMENTS

2014/0247977 A1* 9/2014 Han .................... G06K 9/34
                                                  382/159
2017/0213339 A1   7/2017 Hibbard et al.
2019/0139237 A1* 5/2019 Bresch ................ G06T 7/33

OTHER PUBLICATIONS

Cicek, Ozgun, et al., "3D U-Net: Learning Dense Volumetric Segmentation from Sparse Annotation", (Jun. 21, 2016), 8 pgs.

Claudia, Chevrefils, et al., "Quantitative evaluation of an automatic segmentation method fo r 3D reconstruction of intervertebral scoliotic disks from MR images", http://www.bion,edcentral.com/14 71-2342/17J26, (Dec. 26, 2012), 14 pgs.

CMS Software, Elekta Inc., "ABAS: Intra-Patient Deformable Image Registration for Adaptive Radiotherapy—A White Paper", White Paper, 9 pgs.

Han, Xiao, et al., "Atlas-based Auto-segmentation of Head and Neck CT Images", International Conference on Medical Image Computing and Computer-Assisted Intervention, (2008), 9 pgs.

Hertel, Lars, et al., "Deep Convolutional Neural Networks as Generic Feature Extractors", 2015 International Joint Conference on Neural Networks, (Dec. 17, 2015), 4 pgs.

Kalinic, Hrvoje, "Atlas-based image segmentation: A Survey", semanticscholar.org, (2009), 7 pgs.

Lai, Matthew, "Deep Learning for Medical Image Segmenttion", [online]. Retrieved from the Internet: <URL: https://arxiv.org/pdf/1505.02000v1.pdf?, (2015), 1-23.

Setio, Arnaud A. A., et al., "Pulmonary Nodule Detection in CT Images: False Positive Reduction Using Multi-View Convolutional Networks", IEEE Transactions on Medical Imaging, 35(5), (May 2016), 1160-1169.

Shin, Hoo-Chang, et al., "Deep Convolutional Neural Networks for Computer-Aided Detection: CNN Architectures, Dataset Characteristics and Transfer Learning", IEEE Transactions on Medical Imaging, 35(5), (May 2016), 1285-1298.

"International Application Serial No. PCT US2019 017626, International Search Report dated Apr. 12, 2019", 5 pgs.

"International Application Serial No. PCT US2019 017626, Written Opinion dated Apr. 12, 2019", 8 pgs.

Guo, Yanrong, "Deformable MR Prostate Segmentation via Deep Feature Learning and Sparse Patch Matching", IEEE Transactions on Medical Imaging, IEEE Service Center, Piscataway, NJ, US, vol. 35, No. 4., (Apr. 2016), 1077-1089.

Wu, Guorong, "Scalable High-Performance Image Registration Framework by Unsupervised Deep Feature Representations Learning", IEEE Transactions on Biomedical Engineering, IEEE Service Center, Piscataway, NJ, USA, vol. 63, No. 7., (Jul. 2016), 1505-1516.

* cited by examiner

ATLAS-BASED SEGMENTATION USING DEEP-LEARNING

TECHNICAL FIELD

Embodiments of the present disclosure pertain generally to medical image and artificial intelligence processing techniques. In particular, the present disclosure pertains to use of deep learning models in image segmentation and structure labeling workflows.

BACKGROUND

In radiotherapy or radiosurgery, treatment planning is typically performed based on medical images of a patient and requires the delineation of target volumes and normal critical organs in the medical images. Structure segmentation or contouring of the various patient anatomical structures in medical images is thus a prerequisite and important step for radiotherapy treatment planning; contouring and segmentation presents one of the most tedious and time-consuming steps if performed manually.

Accurate and automatic computer-based segmentation or contouring of anatomical structures can greatly assist the design and/or adaptation of an optimal treatment plan. However, accurate and automatic segmentation of medical images currently remains a challenging task because of deformation and variability of the shapes, sizes, positions, etc. of the target volumes and critical organs in different patients. Atlas-based auto-segmentation (e.g., as implemented in ABAS® software produced by Elekta AB of Stockholm, Sweden) is one approach that has been used to address this task, as atlas-based segmentation involves applying a prior segmentation in an atlas dataset that has structures of interest already identified and labeled.

Atlas-based auto-segmentation, also referred to as registration-based auto-segmentation, performs image segmentation through atlas-registration to a subject image, with subsequent label fusion or refinement. The accuracy of segmentation results from atlas-based auto-segmentation usually relies on the particular atlas registration method that is applied, but the accuracy of atlas-based auto-segmentation has also been improved with label fusion methods that combine segmentation results from multiple atlases. Additionally, some previous approaches have attempted to improve the accuracy of atlas-based auto-segmentation through integration with machine learning-based segmentation methods. For example, Applicant's prior patent application, issued as U.S. Pat. No. 9,122,950 to Xiao Han, titled "Method and apparatus for learning-enhanced atlas-based auto-segmentation", refers to techniques for enhancing the accuracy of atlas-based segmentation using an automated structure classifier that was trained using a machine learning algorithm.

Newer research has suggested the use of deep learning approaches to perform segmentation and identify a variety of states from medical images. Deep learning based on deep Convolutional Neural Networks (CNNs) brings another powerful approach to the medical image segmentation problem. As compared to existing atlas-based auto-segmentation techniques, deep learning is capable of training and operating a structure segmentation model using a much larger set of training data. However, deep learning has some significant downsides which have prevented its widescale usage. Training of the deep learning model is usually very slow—even taking a number of days—and is usually performed offline. However, once the deep learning model is trained, applying the model to a new image can be very fast, often in the order of minutes or even seconds. Additionally, a deep learning model typically works better if the model is trained using a large amount of training data, such as hundreds or thousands of images with ground truth segmentation. Although the availability of such training data may be limited, the ability of a deep learning model to easily accommodate and respond to a large amount of training data serves as a key advantage of deep learning methods. As a result, various approaches are now appearing that discuss performing image segmentation operations using deep learning CNNs.

There are other practical limitations which have prevented the deployment of deep learning as a primary method of performing image segmentation. First, the large set of training data typically required to build an accurate and useful deep learning model for specific segmentation features is not easy to accumulate or manage. Second, different medical facilities may use different imaging protocols and/or different contouring protocols within segmentations; as a result, models trained using data and manual delineations from one facility may not work well on data from a different facility, and may lead to biases in the segmentation results. Third, training a deep learning model typically requires deep technical expertise, and thus it may be difficult for an individual medical user to retrain a model on a private data set or adapt the deep learning model for a specific need. For instance, the user may need to segment more structures in the image than what are available from a pre-trained model. As a result, although deep learning has provided various techniques that appear promising for the identification of anatomical features in medical imaging, it has not yet been successfully adopted in many real-world settings.

SUMMARY

The present disclosure includes procedures to integrate deep learning models and approaches into the workflow of atlas-based segmentation operations, to achieve improved auto-segmentation accuracy and identification of anatomical structures and features. The present disclosure includes a number of illustrative examples relevant to the use of segmentation and deep learning operations in connection with radiotherapy treatment workflows incorporating atlas-based auto-segmentation; however, it will be apparent that the use of deep learning models and segmentation improvements may be incorporated into other medical imaging workflows used for a variety of diagnostic, evaluative, and interpretative settings.

In an example, an implementation of a method for performing atlas-based segmentation using deep learning comprises operations including: applying a deep learning model to a subject image, the deep learning model trained to generate deep learning segmentation data that identifies an anatomical feature in the subject image; registering an atlas image to the subject image, the atlas image being associated with annotation data that identifies the anatomical feature in the atlas image, such that the registering uses the deep learning segmentation data to improve a registration result between the atlas image and the subject image; generating a mapped atlas from registering the atlas image to the subject image; and identifying the anatomical feature in the subject image using the mapped atlas.

Further examples of performing atlas-based segmentation using deep learning may include: performing registering to improve the registration result between the atlas image and the subject image by applying the deep learning segmentation data to determine an initial registration estimation or a constraint based on the anatomical feature identified in the subject image; registering a plurality of atlas images to the subject image, to identify respective positions and boundaries of the anatomical feature in the subject image, by combining results from the plurality of mapped atlases; performing structure labeling of the plurality of anatomical features in the subject image based on the plurality of mapped atlases, and generating a structure label map for the subject image based on the structure labeling of the plurality of anatomical features, and applying the deep learning model to the atlas image, to generate additional deep learning segmentation data that identifies the anatomical feature in the atlas image, and improve a registration result of the anatomical feature between the atlas image and the subject image. Also in further examples, the deep learning model may be trained based on a plurality of medical images that classify respective voxels of the anatomical feature in a segmentation label map, with the plurality of medical images used to train the deep learning model including images from respective medical facilities, and the respective medical facilities utilizing variations in imaging and contouring protocols to identify the anatomical feature in the plurality of medical images.

Also in an example, an implementation of method for defining and operating a machine learning classifier labeling, used in an atlas-based segmentation process using deep learning, comprises operations including: applying a deep learning model to an atlas image, the deep learning model adapted to generate data from analyzing a plurality of anatomical structures in the atlas image; training a machine learning model classifier, using the data generated from applying the deep learning model, such that the machine learning model classifier trained to classify the anatomical structures in the atlas image; applying the trained machine learning model classifier to a subject image, to produce classifications of respective areas of the subject image; estimating structure labels of the respective areas of the subject image based on the classifications of the respective areas of the subject image; and defining structure labels of the respective areas of the subject image, by combining the estimated structure labels with structure labels produced from an atlas-based segmentation on the subject image.

Further examples of machine learning classifier training and operation may include: use of data generated from applying the deep learning model that comprises a feature map produced from analyzing the input image in an intermediate convolution layer of the convolutional neural network; registering a plurality of atlas images to the subject image, generating a plurality of mapped atlases on the subject image, based on registering the plurality of atlas images to the subject image, and producing the structure labels of the subject image from a plurality of mapped atlases; performing label refinement and label fusion for a plurality of labels indicated from the plurality of mapped atlases; training the machine learning model classifier by using segmentation results produced from applying the deep learning model to the plurality of atlas images; training the machine learning model classifier by using segmentation feature data produced from applying the deep learning model to the plurality of atlas images; and generating a label map of the subject image, from the structure labels of the respective areas of the subject image, such that the label map identifies respective segments of the subject image.

The examples described herein may be implemented in a variety of embodiments. For example, one embodiment includes a computing device including processing hardware (e.g., a processor or other processing circuitry) and memory hardware (e.g., a storage device or volatile memory) including instructions embodied thereon, such that the instructions, which when executed by the processing hardware, cause the computing device to implement, perform, or coordinate the electronic operations for these techniques and system configurations. Another embodiment discussed herein includes a computer program product, such as may be embodied by a machine-readable medium or other storage device, which provides the instructions to implement, perform, or coordinate the electronic operations for these techniques and system configurations. Another embodiment discussed herein includes a method operable on processing hardware of the computing device, to implement, perform, or coordinate the electronic operations for these techniques and system configurations.

In further embodiments, the logic, commands, or instructions that implement aspects of the electronic operations described above, may be provided in a distributed or centralized computing system, including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

The above overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various embodiments discussed in the present document.

DETAILED DESCRIPTION

In the following detailed description, reference is made to the accompanying drawings which form a part hereof, and which is shown by way of illustration-specific embodiments in which the present invention may be practiced. These embodiments, which are also referred to herein as "examples," are described in sufficient detail to enable those skilled in the art to practice the invention, and it is to be understood that the embodiments may be combined, or that other embodiments may be utilized and that structural, logical and electrical changes may be made without departing from the scope of the present invention. The following detailed description is, therefore, not be taken in a limiting sense, and the scope of the present invention is defined by the appended claims and their equivalents.

The present disclosure includes various techniques to improve the operation of image segmentation processes, including in a manner that provides technical advantages over manual (e.g., human-assisted or human-guided) and conventional atlas-based or artificial intelligence-based approaches to image segmentation. These technical advantages include reduced processing times to generate outputs, improved efficiency in image analysis and visualization operations, and accompanying improvements in processing, memory, and network resources to conduct image segmentation workflow activities. These improved image segmentation workflow activities may be applicable to a variety of medical imaging processing activities used for imaging-based medical treatment and diagnostic actions, and the accompanying information system and artificial intelligence environments that manage data to support such treatment and diagnostic actions.

As further discussed herein, the following uses and deployments of deep learning models enable an improvement in the accuracy and usefulness of a registration result produced from registering an atlas image to the subject image in an atlas-based segmentation workflow. The deep learning segmentation data provides additional information, beyond the original atlas and subject image data, to improve the mapping of one or more anatomical features within atlas registration. Image registration based on image (intensity) data alone is a difficult problem and has many local suboptimal solutions due to ambiguity and noise in the image data. The segmentation results produced from a deep learning model provide extra information and constraints to help guide a segmentation workflow to an improved solution in both registration computation and feature identification.

Figure 1:
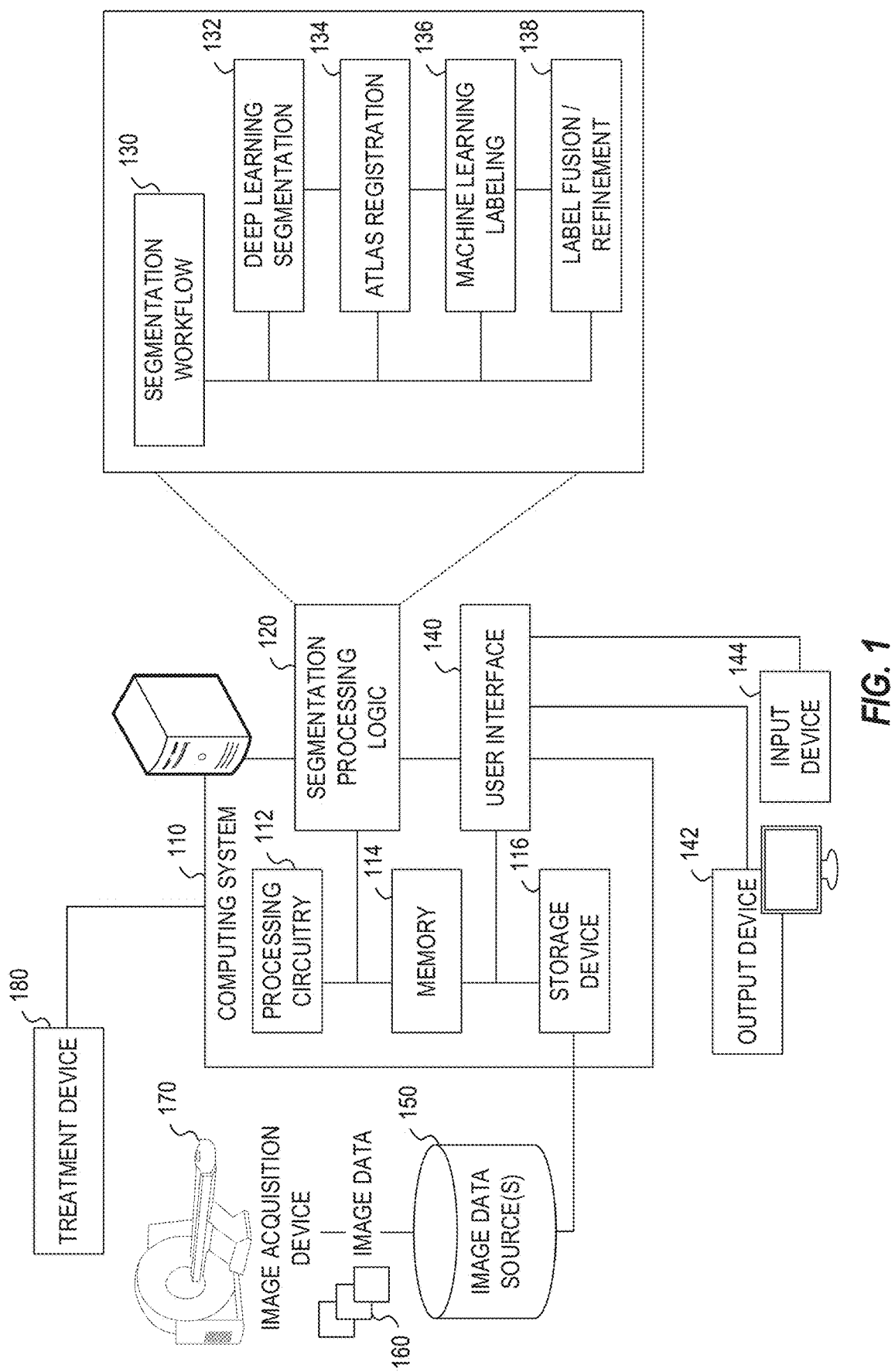
FIG. 1 illustrates an exemplary radiotherapy system adapted for performing image segmentation processing.

FIG. 1 illustrates an exemplary radiotherapy system adapted for performing image segmentation processing. This image segmentation processing is performed to enable the radiotherapy system to provide radiation therapy to a patient based on specific aspects of captured medical imaging data. The radiotherapy system includes an image processing computing system 110 which hosts segmentation processing logic 120. The image processing computing system 110 may be connected to a network (not shown), and such network may be connected to the Internet. For instance, a network can connect the image processing computing system 110 with one or more medical information sources (e.g., a radiology information system (RIS), a medical record system (e.g., an electronic medical record (EMR)/electronic health record (EHR) system), an oncology information system (OIS)), one or more image data sources 150, an image acquisition device 170, and a treatment device 180 (e.g., a radiation therapy device). As an example, the image processing computing system 110 can be configured to perform image segmentation operations by executing instructions or data from the segmentation processing logic 120, as part of operations to generate and customize radiation therapy treatment plans to be used by the treatment device 180.

The image processing computing system 110 may include processing circuitry 112, memory 114, a storage device 116, and other hardware and software-operable features such as a user interface 140, communication interface, and the like. The storage device 116 may store computer-executable instructions, such as an operating system, radiation therapy treatment plans (e.g., original treatment plans, adapted treatment plans and the like), software programs (e.g., radiotherapy treatment plan software, artificial intelligence implementations such as deep learning models, machine learning models, and neural networks, etc.), and any other computer-executable instructions to be executed by the processing circuitry 112.

In an example, the processing circuitry 112 may include a processing device, such as one or more general-purpose processing devices such as a microprocessor, a central processing unit (CPU), a graphics processing unit (GPU), an accelerated processing unit (APU), or the like. More particularly, the processing circuitry 112 may be a complex instruction set computing (CISC) microprocessor, a reduced instruction set computing (RISC) microprocessor, a very long instruction Word (VLIW) microprocessor, a processor implementing other instruction sets, or processors implementing a combination of instruction sets. The processing circuitry 112 may also be implemented by one or more special-purpose processing devices such as an application specific integrated circuit (ASIC), a field programmable gate array (FPGA), a digital signal processor (DSP), a System on a Chip (SoC), or the like. As would be appreciated by those skilled in the art, in some examples, the processing circuitry 112 may be a special-purpose processor, rather than a general-purpose processor. The processing circuitry 112 may include one or more known processing devices, such as a microprocessor from the Pentium™, Core™, Xeon™, or Itanium® family manufactured by Intel™, the Turion™, Athlon™, Sempron™, Opteron™. FX™, Phenom™ family manufactured by AMD™, or any of various processors manufactured by Sun Microsystems. The processing circuitry 112 may also include graphical processing units such as a GPU from the GeForce®, Quadro®, Tesla® family manufactured by Nvidia™, GMA, Iris™ family manufactured by Intel™, or the Radeon™ family manufactured by AMD™. The processing circuitry 112 may also include accelerated processing units such as the Xeon Phi™ family manufactured by Intel™. The disclosed embodiments are not limited to any type of processor(s) otherwise configured to meet the computing demands of identifying, analyzing, maintaining, generating, and/or providing large amounts of data or manipulating such data to perform the methods disclosed herein. In addition, the term "processor" may include more than one processor, for example, a multi-core design or a plurality of processors each having a multi-core design. The processing circuitry 112 can execute sequences of computer program instructions, stored in memory 114, and accessed from the storage device 116, to perform various operations, processes, methods that will be explained in greater detail below.

The memory 114 may comprise read-only memory (ROM), a phase-change random access memory (PRAM), a static random access memory (SRAM), a flash memory, a random access memory (RAM), a dynamic random access memory (DRAM) such as synchronous DRAM (SDRAM), an electrically erasable programmable read-only memory (EEPROM), a static memory (e.g., flash memory, flash disk, static random access memory) as well as other types of random access memories, a cache, a register, a compact disc read-only memory (CD-ROM), a digital versatile disc (DVD) or other optical storage, a cassette tape, other magnetic storage device, or any other non-transitory medium that may be used to store information including image, data, or computer executable instructions (e.g., stored in any format) capable of being accessed by the processing circuitry 112, or any other type of computer device. For instance, the computer program instructions can be accessed by the processing circuitry 112, read from the ROM, or any other suitable memory location, and loaded into the RAM for execution by the processing circuitry 112.

The storage device 116 may constitute a drive unit that includes a machine-readable medium on which is stored one or more sets of instructions and data structures (e.g., software) embodying or utilized by any one or more of the methodologies or functions described herein (including, in various examples, the segmentation processing logic 120 and the user interface 140). The instructions may also reside, completely or at least partially, within the memory 114 and/or within the processing circuitry 112 during execution thereof by the image processing computing system 110, with the memory 114 and the processing circuitry 112 also constituting machine-readable media.

The memory device 114 and the storage device 116 may constitute a non-transitory computer-readable medium. For example, the memory device 114 and the storage device 116 may store or load instructions for one or more software applications on the computer-readable medium. Software applications stored or loaded with the memory device 114 and the storage device 116 may include, for example, an operating system for common computer systems as well as for software-controlled devices. The image processing computing system 110 may also operate a variety of software programs comprising software code for implementing the segmentation processing logic 120 and the user interface 140. Further, the memory device 114 and the storage device 116 may store or load an entire software application, part of a software application, or code or data that is associated with a software application, which is executable by the processing circuitry 112. In a further example, the memory device 114 and the storage device 116 may store, load, and manipulate one or more radiation therapy treatment plans, imaging data, segmentation data, artificial intelligence model data, labels and mapping data, etc. It is contemplated that software programs may be stored not only on the storage device 116 and the memory 114 but also on a removable computer medium, such as a hard drive, a computer disk, a CD-ROM, a DVD, a HD, a Blu-Ray DVD, USB flash drive, a SD card, a memory stick, or any other suitable medium; such software programs may also be communicated or received over a network.

Although not depicted, the image processing computing system 110 may include a communication interface, network interface card, and communications circuitry. An example communication interface may include, for example, a network adaptor, a cable connector, a serial connector, a USB connector, a parallel connector, a high-speed data transmission adaptor (e.g., such as fiber, USB 3.0, thunderbolt, and the like), a wireless network adaptor (e.g., such as a IEEE 802.11/Wi-Fi adapter), a telecommunication adapter (e.g., to communicate with 3G, 4G/LTE, and 5G, networks and the like), and the like. Such a communication interface may include one or more digital and/or analog communication devices that permit a machine to communicate with other machines and devices, such as remotely located components, via a network. The network may provide the functionality of a local area network (LAN), a wireless network, a cloud computing environment (e.g., software as a service, platform as a service, infrastructure as a service, etc.), a client-server, a wide area network (WAN), and the like. For example, network may be a LAN or a WAN that may include other systems (including additional image processing computing systems or image-based components associated with medical imaging or radiotherapy operations).

In an example, the image processing computing system 110 may obtain image data 160 from the image data source 150, for hosting on the storage device 116 and the memory 114. In an example, the software programs operating on the image processing computing system 110 may convert medical images of one format (e.g., MRI) to another format (e.g., CT), such as by producing synthetic images, such as a pseudo-CT image. In another example, the software programs may register or associate a patient medical image (e.g., a CT image or an MR image) with that patient's dose distribution of radiotherapy treatment (e.g., also represented as an image) so that corresponding image voxels and dose voxels are appropriately associated. In yet another example, the software programs may substitute functions of the patient images such as signed distance functions or processed versions of the images that emphasize some aspect of the image information. Such functions might emphasize edges or differences in voxel textures, or other structural aspects. In another example, the software programs may visualize, hide, emphasize, or de-emphasize some aspect of anatomical features, segmented features, or dose or treatment information, within medical images. The storage device 116 and memory 114 may store and host data to perform these purposes, including the image data 160, patient data, and other data required to create and implement a radiation therapy treatment plan and associated segmentation operations.

The processing circuitry 112 may be communicatively coupled to the memory 114 and the storage device 116, and the processing circuitry 112 may be configured to execute computer executable instructions stored thereon from either the memory 114 or the storage device 116. The processing circuitry 112 may execute instructions to cause medical images from the image data 160 to be received or obtained in memory 114, and processed using the segmentation processing logic 120. For example, the image processing computing system 110 may receive image data 160 from the image acquisition device 170 or image data sources 150 via a communication interface and network to be stored or cached in the storage device 116. The processing circuitry 112 may also send or update medical images stored in memory 114 or the storage device 116 via a communication interface to another database or data store (e.g., a medical facility database). In some examples, one or more of the systems may form a distributed computing/simulation environment that uses a network to collaboratively perform the embodiments described herein. In addition, such network may be connected to internet to communicate with servers and clients that reside remotely on the internet.

In further examples, the processing circuitry 112 may utilize software programs (e.g., a treatment planning software) along with the image data 160 and other patient data to create a radiation therapy treatment plan. In an example, the image data 160 may include atlas information or other information such as data associated with a patient anatomical region, organ, or volume of interest segmentation data. Patient data may include information such as (1) functional organ modeling data (e.g., serial versus parallel organs, appropriate dose response models, etc.); (2) radiation dosage data (e.g., dose-volume histogram (DVH) information); or (3) other clinical information about the patient and course of treatment (e.g., other surgeries, chemotherapy, previous radiotherapy, etc.). In a further example, the atlas data provides segmentation or labeling of anatomical features, that is specific to the patient, a set of patients, a procedure or type of treatment, a set of procedures or treatments, an image acquisition device, a medical facility, or the like.

In addition, the processing circuitry 112 may utilize software programs to generate intermediate data such as updated parameters to be used, for example, by a neural network model, machine learning model, atlas-segmentation workflow, or other aspects involved with segmentation of the image data 160. Further, such software programs may utilize segmentation processing logic 120 to implement a segmentation workflow 130, using the techniques further discussed herein. The processing circuitry 112 may subsequently then transmit the executable radiation therapy treatment plan via a communication interface and the network to the treatment device 180, where the radiation therapy plan will be used to treat a patient with radiation via the treatment device, consistent with results of the segmentation workflow. Other outputs and uses of the software programs and the segmentation workflow 130 may occur with use of the image processing computing system 110.

As discussed herein (e.g., with reference to the deep learning processing discussed with reference to FIGS. 3 and 4, and the segmentation processing discussed with reference to FIGS. 5 to 9), the processing circuitry 112 may execute software programs that invokes the segmentation processing logic 120 to implement functions including image segmentation, machine learning, deep learning, neural networks, and other aspects of automatic processing and artificial intelligence. For instance, the processing circuitry 112 may execute software programs that train, contour, label, or analyze features of a medical image; such software when executed may train a boundary detector, or utilize a shape dictionary.

In an example, the image data 160 may include one or more MRI image (e.g., 2D MRI, 3D MRI, 2D streaming MRI, 4D MRI, 4D volumetric MRI, 4D cine MRI, etc.), functional MRI images (e.g., fMRI, DCE-MRI, diffusion MRI), Computed Tomography (CT) images (e.g., 2D CT, Cone beam CT, 3D CT, 4D CT), ultrasound images (e.g., 2D ultrasound, 3D ultrasound, 4D ultrasound), Positron Emission Tomography (PET) images, X-ray images, fluoroscopic images, radiotherapy portal images, Single-Photo Emission Computed Tomography (SPECT) images, computer generated synthetic images (e.g., pseudo-CT images) and the like. Further, the image data 160 may also include or be associated with medical image processing data, for instance, training images, and ground truth images, contoured images, and dose images. In an example, the image data 160 may be received from the image acquisition device 170 and stored in one or more of the image data sources 150 (e.g., a Picture Archiving and Communication System (PACS), a Vendor Neutral Archive (VNA), a medical record or information system, a data warehouse, etc.). Accordingly, the image acquisition device 170 may comprise a MRI imaging device, a CT imaging device, a PET imaging device, an ultrasound imaging device, a fluoroscopic device, a SPECT imaging device, an integrated Linear Accelerator and MRI imaging device, or other medical imaging devices for obtaining the medical images of the patient. The image data 160 may be received and stored in any type of data or any type of format (e.g., in a Digital Imaging and Communications in Medicine (DICOM) format) that the image acquisition device 170 and the image processing computing system 110 may use to perform operations consistent with the disclosed embodiments.

In an example, the image acquisition device 170 may be integrated with the treatment device 180 as a single apparatus (e.g., a MRI device combined with a linear accelerator, also referred to as an "MRI-Linac"). Such an MRI-Linac can be used, for example, to determine a location of a target organ or a target tumor in the patient, so as to direct radiation therapy accurately according to the radiation therapy treatment plan to a predetermined target. For instance, a radiation therapy treatment plan may provide information about a particular radiation dose to be applied to each patient. The radiation therapy treatment plan may also include other radiotherapy information, such as beam angles, dose-histogram-volume information, the number of radiation beams to be used during therapy, the dose per beam, and the like.

The image processing computing system 110 may communicate with an external database through a network to send/receive a plurality of various types of data related to image processing and radiotherapy operations. For example, an external database may include machine data that is information associated with the treatment device 180, the image acquisition device 170, or other machines relevant to radiotherapy or medical procedures. Machine data information may include radiation beam size, arc placement, beam on and off time duration, machine parameters, segments, multi-leaf collimator (MLC) configuration, gantry speed, MRI pulse sequence, and the like. The external database may be a storage device and may be equipped with appropriate database administration software programs. Further, such databases or data sources may include a plurality of devices or systems located either in a central or a distributed manner.

The image processing computing system 110 can collect and obtain data, and communicate with other systems, via a network using one or more communication interfaces, which are communicatively coupled to the processing circuitry 112 and the memory 114. For instance, a communication interface may provide communication connections between the image processing computing system 110 and radiotherapy system components (e.g., permitting the exchange of data with external devices). For instance, the communication interface may in some examples have appropriate interfacing circuitry from an output device 142 or an input device 144 to connect to the user interface 140, which may be a hardware keyboard, a keypad, or a touch screen through which a user may input information into the radiotherapy system.

As an example, the output device 142 may include a display device which outputs a representation of the user interface 140 and one or more aspects, visualizations, or representations of the medical images. The output device 142 may include one or more display screens that display medical images, interface information, treatment planning parameters (e.g., contours, dosages, beam angles, labels, maps, etc.) treatment plans, a target, localizing a target and/or tracking a target, or any related information to the user. The input device 144 connected to the user interface 140 may be a keyboard, a keypad, a touch screen or any type of device that a user may input information to the radiotherapy system. Alternatively, the output device 142, the input device 144, and features of the user interface 140 may be integrated into a single device such as a smartphone or tablet computer, e.g., Apple iPad®, Lenovo Thinkpad®, Samsung Galaxy®, etc.

Furthermore, any and all components of the radiotherapy system may be implemented as a virtual machine (e.g., via VMWare, Hyper-V, and the like virtualization platforms). For instance, a virtual machine can be software that functions as hardware. Therefore, a virtual machine can include at least one or more virtual processors, one or more virtual memories, and one or more virtual communication interfaces that together function as hardware. For example, the image processing computing system 110, the image data sources 150, or like components, may be implemented as a virtual machine or within a cloud-based virtualization environment.

The segmentation processing logic 120 or other software programs may cause the computing system to communicate with the image data sources 150 to read images into memory 114 and the storage device 116, or store images or associated data from the memory 114 or the storage device 116 to and from the image data sources 150. For example, the image data source 150 may be configured to store and provide a plurality of images (e.g., 3D MRI, 4D MRI, 2D MRI slice images, CT images, 2D Fluoroscopy images, X-ray images, raw data from MR scans or CT scans, Digital Imaging and Communications in Medicine (DICOM) metadata, etc.) that the image data source 150 hosts, from image sets in image data 160 obtained from one or more patients via the image acquisition device 170. The image data source 150 or other databases may also store data to be used by the segmentation processing logic 120 when executing a software program that performs segmentation operations, or when creating radiation therapy treatment plans. Further, various databases may store the data produced by the trained deep learning neural network, image atlases, or machine learning models, including the network parameters constituting the model learned by the network and the resulting predicted data. The image processing computing system 110 thus may obtain and/or receive the image data 160 (e.g., 2D MRI slice images, CT images, 2D Fluoroscopy images, X-ray images, 3DMRI images, 4D MRI images, etc.) from the image data source 150, the image acquisition device 170, the treatment device 180 (e.g., a MRI-Linac), or other information systems, in connection with performing image segmentation as part of treatment or diagnostic operations.

The image acquisition device 170 can be configured to acquire one or more images of the patient's anatomy for a region of interest (e.g., a target organ, a target tumor or both). Each image, typically a 2D image or slice, can include one or more parameters (e.g., a 2D slice thickness, an orientation, and a location, etc.). In an example, the image acquisition device 170 can acquire a 2D slice in any orientation. For example, an orientation of the 2D slice can include a sagittal orientation, a coronal orientation, or an axial orientation. The processing circuitry 112 can adjust one or more parameters, such as the thickness and/or orientation of the 2D slice, to include the target organ and/or target tumor. In an example, 2D slices can be determined from information such as a 3D MRI volume. Such 2D slices can be acquired by the image acquisition device 170 in "near real-time" while a patient is undergoing radiation therapy treatment, for example, when using the treatment device 180 (with "near real-time" meaning acquiring the data in at least milliseconds or less).

The segmentation processing logic 120 in the image processing computing system 110 is depicted as implementing a segmentation workflow 130 with various aspects of segmentation and image processing operations. In an example, the segmentation workflow 130 operated by the segmentation processing logic 120 integrates with use of deep learning segmentation functionality 132 (e.g., performing segmentation processing with use of a deep learning model as illustrated with FIGS. 3 and 4), atlas registration 134 (e.g., performing atlas-based auto-segmentation, enhanced by deep learning operations, as illustrated with FIGS. 5 and 6), machine learning labeling 136 (e.g., performing machine learning operations for segmentation, enhanced by deep learning operations, as illustrated with FIGS. 7 to 9), and label fusion and refinement 138 (e.g., performing labeling outputs, enhanced by deep learning operations, as illustrated with FIGS. 5 to 9). Other segmentation and image handling functionality not expressly depicted may be incorporated into the segmentation workflow 130.

The segmentation processing logic 120 and the segmentation workflow 130 may be used when generating the radiation therapy treatment plan, within use of software programs such as treatment planning software, such as Monaco, manufactured by Elekta AB of Stockholm, Sweden. In order to generate the radiation therapy treatment plans, the image processing computing system 110 may communicate with the image acquisition device 170 (e.g., a CT device, a MRI device, a PET device, an X-ray device, an ultrasound device, etc.) to capture and access images of the patient and to delineate a target, such as a tumor. In some examples, the delineation of one or more organs at risk (OARs), such as healthy tissue surrounding the tumor or in close proximity to the tumor may be required. Therefore, segmentation of the OAR may be performed when the OAR is close to the target tumor. In addition, if the target tumor is close to the OAR (e.g., prostate in near proximity to the bladder and rectum), then by segmenting the OAR from the tumor, the radiotherapy system may study the dose distribution not only in the target, but also in the OAR In order to delineate a target organ or a target tumor from the OAR, medical images, such as MRI images. CT images, PET images, fMRI images. X-ray images, ultrasound images, radiotherapy portal images, SPECT images and the like, of the patient undergoing radiotherapy may be obtained non-invasively by the image acquisition device 170 to reveal the internal structure of a body part. Based on the information from the medical images, a 3D structure of the relevant anatomical portion may be obtained. In addition, during a treatment planning process, many parameters may be taken into consideration to achieve a balance between efficient treatment of the target tumor (e.g., such that the target tumor receives enough radiation dose for an effective therapy) and low irradiation of the OAR(s) (e.g., the OAR(s) receives as low a radiation dose as possible). Other parameters that may be considered include the location of the target organ and the target tumor, the location of the OAR, and the movement of the target in relation to the OAR. For example, the 3D structure may be obtained by contouring the target or contouring the OAR within each 2D layer or slice of an MRI or CT image and combining the contour of each 2D layer or slice. The contour may be generated manually (e.g., by a physician, dosimetrist, or health care worker using a program such as MONACO™ manufactured by Elekta AB of Stockholm, Sweden) or automatically (e.g., using a program such as the Atlas-based auto-segmentation software, ABAS®, manufactured by Elekta AB of Stockholm. Sweden). In certain examples, the 2D or 3D structure of a target tumor or an OAR may be generated automatically by the treatment planning software, using the segmentation processing logic 120.

After the target tumor and the OAR(s) have been located and delineated, a dosimetrist, physician or healthcare worker may determine a dose of radiation to be applied to the target tumor, as well as any maximum amounts of dose that may be received by the OAR proximate to the tumor (e.g., left and right parotid, optic nerves, eyes, lens, inner ears, spinal cord, brain stem, and the like). After the radiation dose is determined for each anatomical structure (e.g., target tumor, OAR), a process known as inverse planning may be performed to determine one or more treatment plan parameters that would achieve the desired radiation dose distribution. Examples of treatment plan parameters include volume delineation parameters (e.g., which define target volumes, contour sensitive structures, etc.), margins around the target tumor and OARs, beam angle selection, collimator settings, and beam-on times. During the inverse-planning process, the physician may define dose constraint parameters that set bounds on how much radiation an OAR may receive (e.g., defining full dose to the tumor target and zero dose to any OAR; defining 95% of dose to the target tumor; defining that the spinal cord, brain stem, and optic structures receive ≤45 Gy, ≤55 Gy and ≤54 Gy, respectively). The result of inverse planning may constitute a radiation therapy treatment plan that may be stored. Some of these treatment parameters may be correlated. For example, tuning one parameter (e.g., weights for different objectives, such as increasing the dose to the target tumor) in an attempt to change the treatment plan may affect at least one other parameter, which in turn may result in the development of a different treatment plan. Thus, the image processing computing system 110 can generate a tailored radiation therapy treatment plan having these parameters in order for the treatment device 180 to provide suitable radiotherapy treatment to the patient.

Figure 2:
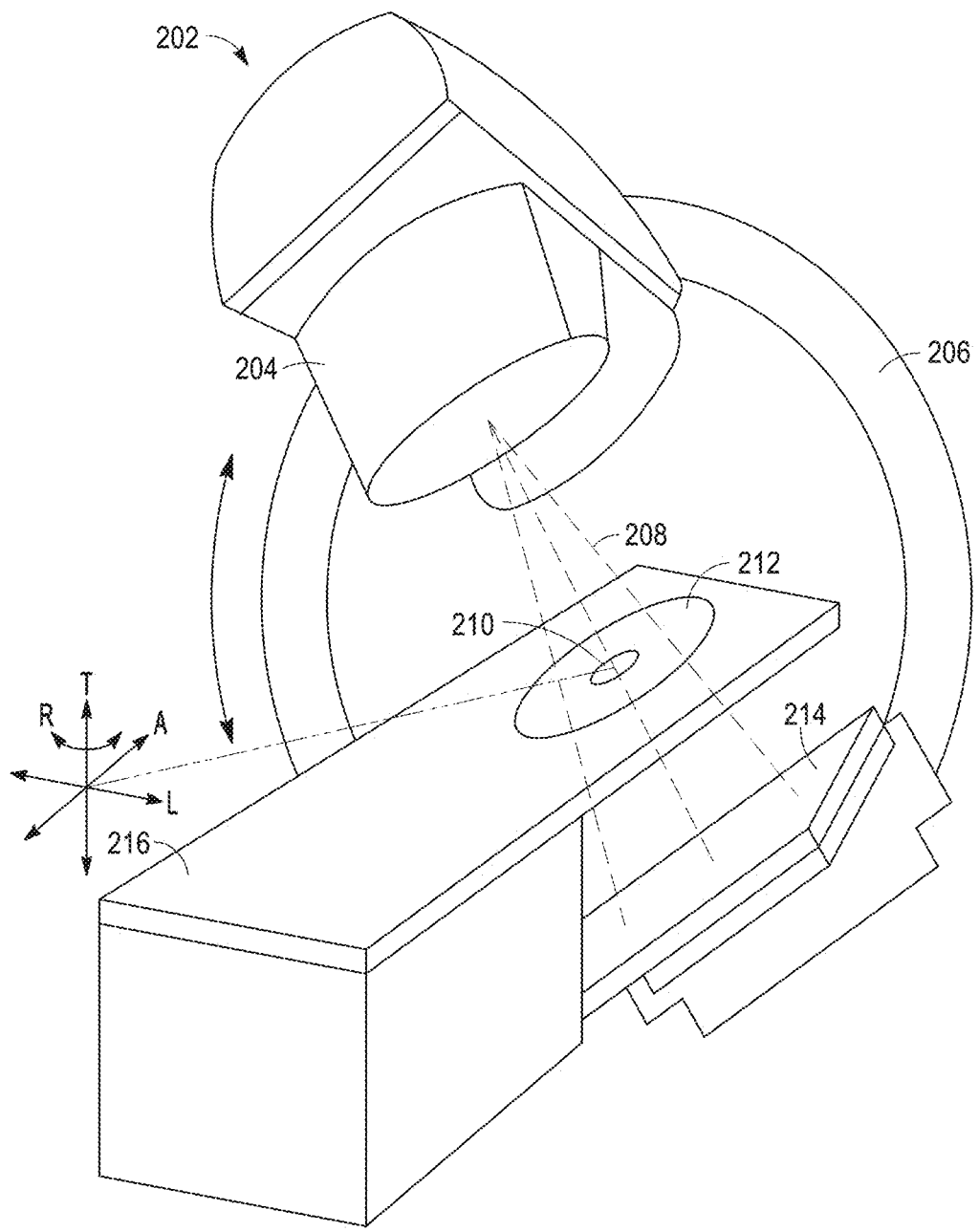
FIG. 2 illustrates an exemplary image-guided radiotherapy device.

FIG. 2 illustrates an exemplary image-guided radiotherapy device 202, that includes include a radiation source, such as an X-ray source or a linear accelerator, a couch 216, an imaging detector 214, and a radiation therapy output 204. The radiation therapy device 202 may be configured to emit a radiation beam 208 to provide therapy to a patient. The radiation therapy output 204 can include one or more attenuators or collimators, such as a multi-leaf collimator (MLC).

As an example, a patient can be positioned in a region 212, supported by the treatment couch 216 to receive a radiation therapy dose according to a radiation therapy treatment plan (e.g., a treatment plan generated by the radiotherapy system of FIG. 1). The radiation therapy output 204 can be mounted or attached to a gantry 206 or other mechanical support. One or more chassis motors (not shown) may rotate the gantry 206 and the radiation therapy output 204 around couch 216 when the couch 216 is inserted into the treatment area. In an example, gantry 206 may be continuously rotatable around couch 216 when the couch 216 is inserted into the treatment area. In another example, gantry 206 may rotate to a predetermined position when the couch 216 is inserted into the treatment area. For example, the gantry 206 can be configured to rotate the therapy output 204 around an axis ("A"). Both the couch 216 and the radiation therapy output 204 can be independently moveable to other positions around the patient, such as moveable in transverse direction ("T"), moveable in a lateral direction ("L"), or as rotation about one or more other axes, such as rotation about a transverse axis (indicated as "R"). A controller communicatively connected to one or more actuators (not shown) may control the couch 216 movements or rotations in order to properly position the patient in or out of the radiation beam 208 according to a radiation therapy treatment plan. As both the couch 216 and the gantry 206 are independently moveable from one another in multiple degrees of freedom, which allows the patient to be positioned such that the radiation beam 208 precisely can target the tumor.

The coordinate system (including axes A, T, and L) shown in FIG. 2 can have an origin located at an isocenter 210. The isocenter can be defined as a location where the central axis of the radiation therapy beam 208 intersects the origin of a coordinate axis, such as to deliver a prescribed radiation dose to a location on or within a patient. Alternatively, the isocenter 210 can be defined as a location where the central axis of the radiation therapy beam 208 intersects the patient for various rotational positions of the radiation therapy output 204 as positioned by the gantry 206 around the axis A.

Gantry 206 may also have an attached imaging detector 214. The imaging detector 214 is preferably located opposite to the radiation source (output 204), and in an example, the imaging detector 214 can be located within a field of the therapy beam 208.

The imaging detector 214 can be mounted on the gantry 206 preferably opposite the radiation therapy output 204, such as to maintain alignment with the therapy beam 208. The imaging detector 214 rotating about the rotational axis as the gantry 206 rotates. In an example, the imaging detector 214 can be a flat panel detector (e.g., a direct detector or a scintillator detector). In this manner, the imaging detector 214 can be used to monitor the therapy beam 208 or the imaging detector 214 can be used for imaging the patient's anatomy, such as portal imaging. The control circuitry of radiation therapy device 202 may be integrated within the radiotherapy system or remote from it.

In an illustrative example, one or more of the couch 216, the therapy output 204, or the gantry 206 can be automatically positioned, and the therapy output 204 can establish the therapy beam 208 according to a specified dose for a particular therapy delivery instance. A sequence of therapy deliveries can be specified according to a radiation therapy treatment plan, such as using one or more different orientations or locations of the gantry 206, couch 216, or therapy output 204. The therapy deliveries can occur sequentially, but can intersect in a desired therapy locus on or within the patient, such as at the isocenter 210. A prescribed cumulative dose of radiation therapy can thereby be delivered to the therapy locus while damage to tissue nearby the therapy locus can be reduced or avoided.

Thus, FIG. 2 specifically illustrates an example of a radiation therapy device 202 operable to provide radiotherapy treatment to a patient, with a configuration where a radiation therapy output can be rotated around a central axis (e.g., an axis "A"). Other radiation therapy output configurations can be used. For example, a radiation therapy output can be mounted to a robotic arm or manipulator having multiple degrees of freedom. In yet another example, the therapy output can be fixed, such as located in a region laterally separated from the patient, and a platform supporting the patient can be used to align a radiation therapy isocenter with a specified target locus within the patient. In another example, a radiation therapy device can be a combination of a linear accelerator and an image acquisition device. In some examples, the image acquisition device may be an MRI, an X-ray, a CT, a CBCT, a spiral CT, a PET, a SPECT, an optical tomography, a fluorescence imaging, ultrasound imaging, or radiotherapy portal imaging device, etc., as would be recognized by one of ordinary skill in the art.

Figure 3:
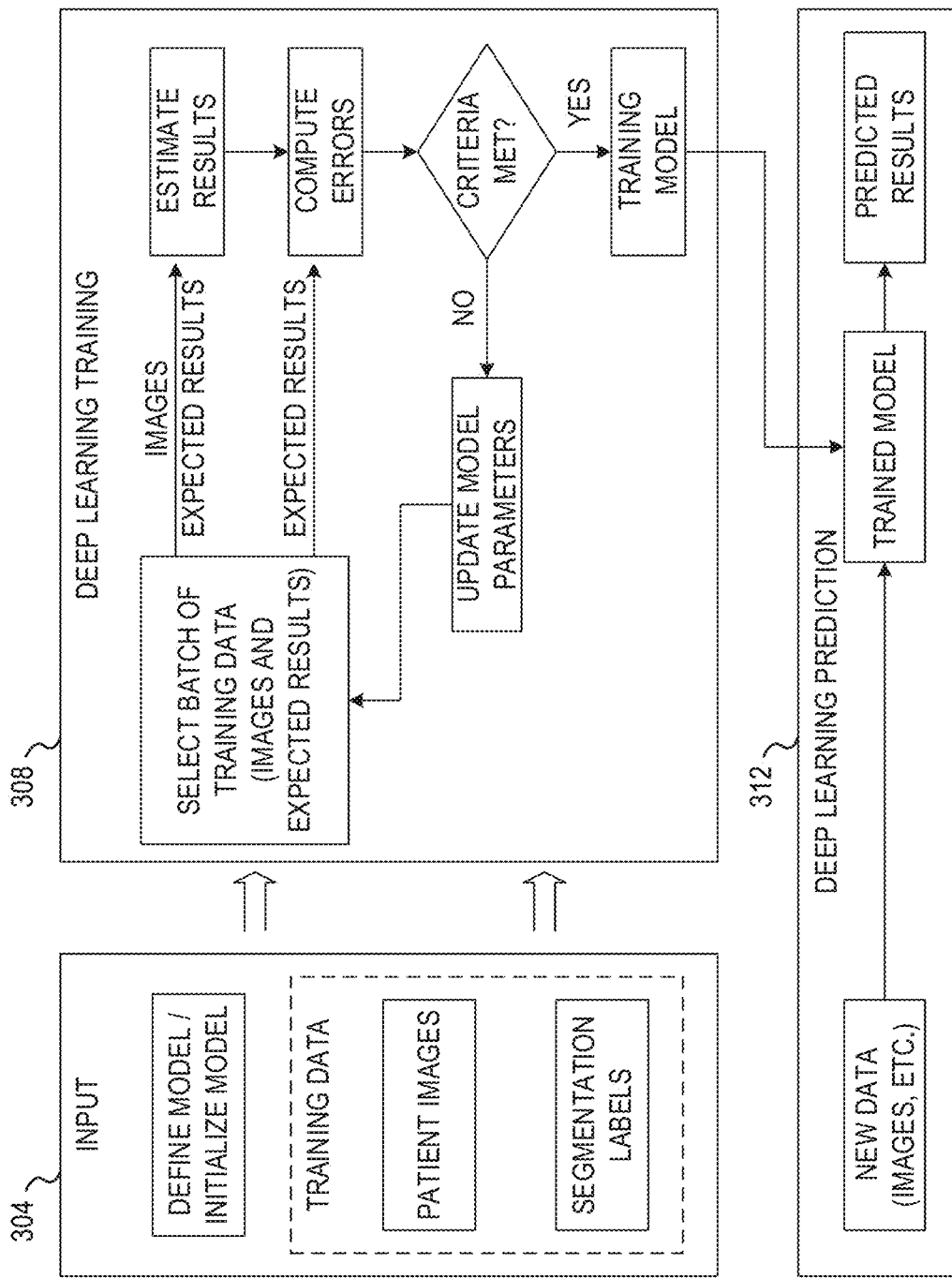
FIG. 3 illustrates an exemplary flow diagram for operation of a deep learning model.

FIG. 3 illustrates an exemplary flow diagram for deep learning operations, where a deep learning model, such as a deep convolutional neural network (CNN), can be trained and used to perform segmentation operations. For instance, the deep learning model of FIG. 3 may include the deep learning segmentation functionality 132 provided as part of the segmentation processing logic 120 in the radiotherapy system of FIG. 1.

In an example, inputs 304 for the deep learning operations can include a defined deep learning model receiving or obtaining an initial set of values and training data. The training data can include, for example, hundreds or thousands of images with ground truth segmentation labels, contours, and other identifiers of segmentation features. The deep learning model may be structured to include an artificial neural network, such as a deep CNN model discussed with reference to FIG. 4 below. The deep learning network can be trained as part of online or offline training methods, as integrated into the particular segmentation and radiotherapy use cases (and as adjusted or re-trained with operational parameters or additional training data from the use cases). When trained on a series of images, for example, the deep learning network can be used to produce an indication in the form of a classification, probability, or other predicted result of a new subject image.

During training 308 of deep learning model, a batch of training data can be selected or provided from an existing image data set. The selected training data can include a set of patient images and corresponding ground truth segmentation labels that identify anatomical structures, features, or characteristics in the patient images. Various algorithms in the deep learning model can be applied to the selected training data, which can then be compared to the expected results (e.g., ground truth segmentation values corresponding to the segmentation labels), to compute a difference that can provide an indication of training errors. The errors can be used during a procedure called backpropagation to correct the errors in parameters of the deep learning network (e.g., layer node weights and biases), such as to reduce or minimize errors in the segmentation value estimates during subsequent trials. The errors can be compared to predetermined criteria, such as proceeding to a sustained minimum for a specified number of training iterations. If the errors do not satisfy the predetermined criteria, then model parameters of the deep learning model can be updated using backpropagation, and another batch of training data can be selected from the training data set, as expected results are analyzed for another iteration of deep learning model training. If the errors satisfy the predetermined criteria, then the training can be ended and the trained model can then be deployed during a deep learning prediction stage 312 (including, a further testing or inference stage) to predict segmentation results of subject images that differ from the training data. The trained model thus can be utilized to receive and parse new image data and provide predicted results (e.g., segmentation classifications, labels, mappings, probabilities, etc.) on the new image data.

Accordingly, during the training 308 and the prediction 312 (deployment) of the deep learning model, a number of parameters in the convolution layers of the deep learning model may be changed and applied to optimize the model output to an expected state. In the context of medical image feature recognition, a significantly large set of training data is needed to successfully train the parameters of the model to handle a variety of real-world image use cases, and produce a prediction to as close to the ground truth as possible. However, due to the large variation in medical images from different patients and imaging sources, the many different segmentation pathways and preferences, and the inconsistency and difficulty in training a deep learning model from training data, deep learning may not provide a standalone solution to medical image segmentation. Thus, as discussed in the following paragraphs, the integration of deep learning data and prediction into various atlas-based auto-segmentation processes may provide an effective hybrid approach with significant advantages over existing segmentation approaches.

As indicated previously, various atlas-based auto-segmentation methods have been developed to perform contouring and labeling of anatomical structures in radiotherapy treatment planning. Atlas-based auto-segmentation methods map contours in a new (subject) image based on a previously defined anatomy configuration in a reference image, specifically, the atlas. Although some atlas registration methods have become very effective, the shapes and sizes of some organs may vary for different patients, and may be deformed in large scales at different stages for the same patient. This may decrease the registration accuracy and affect the automatic segmentation performed by atlas-based auto-segmentation methods, or even prevent the usage of atlas-based methods entirely.

The integration of information from a deep learning model into aspects of a segmentation workflow involving atlas-based auto-segmentation methods may provide a significant improvement over conventional methods that exclusively rely on the use of atlases. The use of a deep learning model and artificial neural network operations into aspects of a segmentation workflow also provides advantages over machine-learning approaches to image segmentation, and approaches which have relied on the exclusive use of deep learning. As discussed in the following examples, the segmentation data produced or predicted from the deep learning model may be integrated into a variety of stages of atlas-based auto-segmentation methods, presenting a hybrid approach for segmentation that emphasizes the strengths of deep learning and atlas-based image registration (and, as applicable, machine learning classifications).

An exemplary deep learning model that may be produced for image segmentation operations comprises a convolutional neural network (CNN). A CNN is a type of machine learning algorithm that can be trained by supervised learning. Supervised learning is a branch of machine learning that infers a predication model given a set of training data. Each individual sample of the training data is a pair containing a dataset (e.g., an image) and a desired output value or dataset. A supervised learning algorithm analyzes the training data and produces a predictor function. The predictor function, once derived through training, is capable of reasonably predicting or estimating the correct output value or dataset for a valid input. The predictor function may be formulated based on various machine learning models, algorithms, and/or processes.

The architecture of a CNN model includes a stack of distinct layers that transform the input into the output. Examples of the different layers may include one or more convolutional layers, non-linear operator layers (such as rectified linear units (ReLu) functions, sigmoid functions, or hyperbolic tangent functions), pooling or subsampling layers, fully connected layers, and/or final loss layers. Each layer may connect one upstream layer and one downstream layer. The input may be considered as an input layer, and the output may be considered as the final output layer.

To increase the performance and learning capabilities of CNN models, the number of different layers can be selectively increased. The number of intermediate distinct layers from the input layer to the output layer can become very large, thereby increasing the complexity of the architecture of the CNN model. CNN models with a large number of intermediate layers are referred to as deep CNN models. For example, some deep CNN models may include more than 20 to 30 layers, and other deep CNN models may even include more than a few hundred layers. Examples of deep CNN models include AlexNet, VGGNet, GoogLeNet, ResNet, etc.

The present disclosure employs the powerful learning capabilities of CNN models, and particularly deep CNN models, for segmenting anatomical structures of medical images in connection with segmentation and feature labeling workflows. Consistent with the disclosed examples, segmentation of a medical image may be performed using a trained CNN model to label or classify each voxel of an input 3D image, or each pixel of an input 2D image, with an anatomical structure. Advantageously, use of the CNN model for image segmentation in the embodiments of the present disclosure allows for automatic segmentation of anatomical structures, from a large set of training examples, without the need of manual feature extraction (as is often required for traditional machine learning methods). Further, as discussed with reference to FIGS. 5 to 9, use of data from a CNN model may provide a significant benefit for atlas-based segmentation and labeling operations for both image registration and labeling aspects of atlas-based segmentation.

As used herein, a deep learning model used by the disclosed segmentation methods and workflows may refer to any neural network model formulated, adapted, or modified based on a framework of convolutional neural network. For example, a deep learning model used for segmentation in embodiments of the present disclosure may selectively include intermediate layers between the input and output layers, such as one or more deconvolutional layers, up-sampling or up-pooling layers, pixel-wise predicting layers, and/or copy and crop operator layers.

Figure 4:
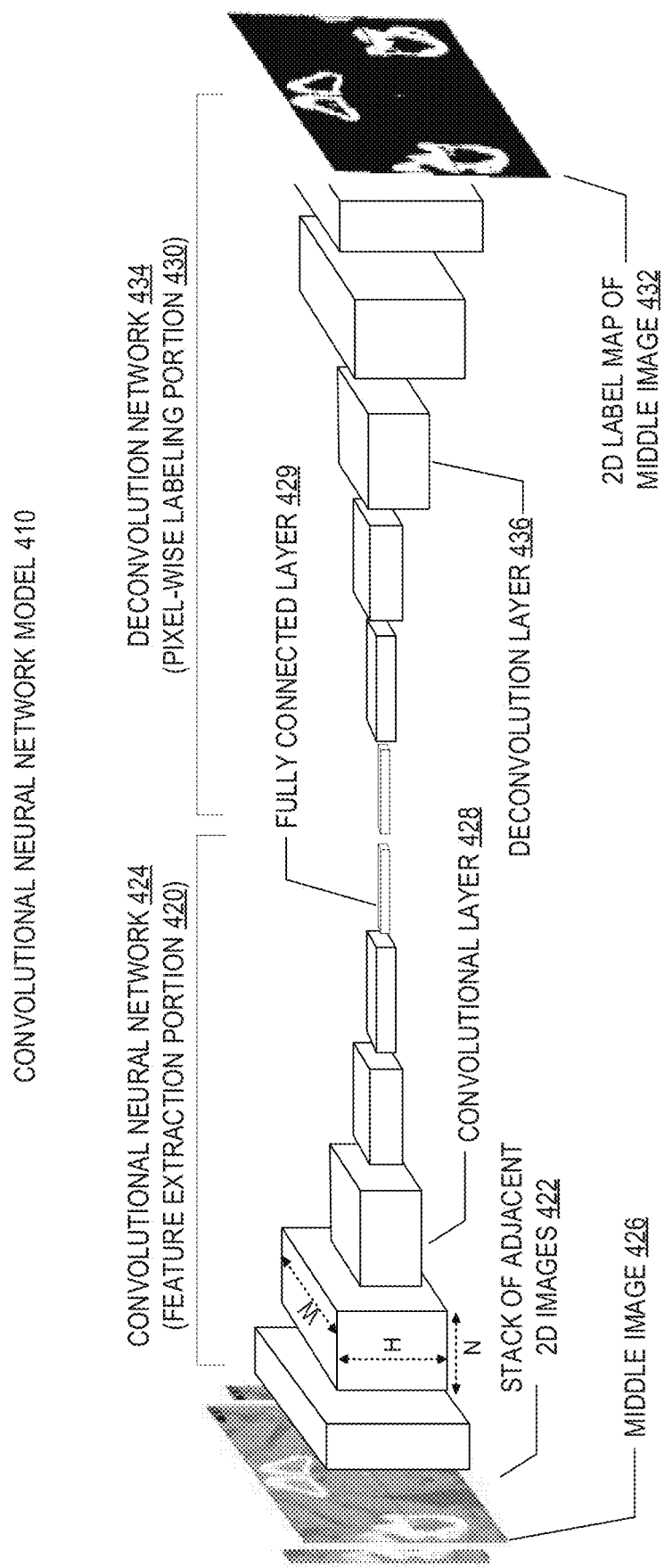
FIG. 4 illustrates an exemplary convolutional neural network model for image segmentation.

FIG. 4 illustrates a simplified example of a deep learning model, implemented in a CNN model for image segmentation. As shown in FIG. 4, a CNN model 410 for image segmentation may receive a stack of adjacent 2D images as input and outputs a predicted 2D label map of one of the images (e.g., the image in the middle of the stack). The 2D label map produced from the CNN model may provide structure labels of one, two, or more images in the stack, based on feature extraction and labeling.

As shown in FIG. 4, the CNN model 410 may generally include two portions: a first feature extraction portion 420 and a second pixel-wise labeling portion 430. Feature extraction portion 420, for instance, may extract one or more features of an input stack of adjacent 2D images 422. In the following examples, segmentation is performed for anatomical features from a stack of 2D images that constitutes a set of 3D data. However, the following segmentation examples and designs of the CNN model 410 may also be applicable to perform segmentation or classification of individual 2D images or other forms of medical imaging data.

In an example, the feature extraction portion 420 uses a convolutional neural network 424 to receive input stack of adjacent 2D images 422 and to output at least one feature vector or matrix representing the features of the input stack. The pixel-wise labeling portion 430 uses the output of feature extraction portion 420 to predict a 2D label map 432 of middle image 426 of input stack of adjacent 2D images 422. Pixel-wise labeling portion 430 may be performed using any suitable approach, such as a patch-based approach and a fully mapped approach. For instance, the use of a stack of adjacent 2D images that contain dependent structure information both for training and as the input of CNN model 410 improves the accuracy of the prediction of output 2D label map 432 by CNN model 410. This further improves the accuracy of the predicted 3D label map of a 3D image constructed from 2D label maps predicted for each image slice of the 3D image.

In an example, features may be identified in the CNN based on a spatially dependent relationship between the anatomical structures shown in the stack of adjacent 2D images along the axis orthogonal to the anatomical plane of the 2D images. As a non-limiting example, the shape and type of an anatomical structure represented by a first set of pixels in a first image of the stack may also be represented by a second set of pixels in a second image adjacent to the first image. This is because the spatial neighboring of the first and second images along the axis orthogonal to the anatomical plane allows for some dependency or continuity of the anatomical structures shown in these images. Therefore, the shape, size, or type of an anatomical structure in one image may provide information of the shape, size, or type of the anatomical structure in another adjacent image along the same plane.

As another non-limiting example, when the stack of adjacent 2D images includes three sequential images, e.g., first, second, and third image slices stacked in sequence, an anatomical structure may be shown in both a first set of pixels in the first image slice of the stack and a third set of pixels in a third image slice of the stack, but not in a corresponding second set of pixels (e.g., pixels having similar spatial locations as those of the first and/or third set of pixels) of the second image slice that is between and adjacent to the first and third image slices. In such instances, the corresponding pixels in the second image slice may be incorrectly labeled. Such discontinuity of the anatomical structure in the stack of three adjacent 2D image slices can be used as dependent structure information for training CNN model 410.

As another non-limiting example, in a stack of three adjacent 2D images, e.g., first, second, and third image slices stacked in sequence, both a first set of pixels in the first image slice of the stack and a third set of pixels in the third image slice may indicate the background, but a corresponding second set of pixels of the second image slice between and adjacent to the first and third image slices may indicate an anatomical structure. The corresponding pixels in the second image slice may be subject to noise that generates a false positive signal. Such discontinuity of the background in the stack of three adjacent 2D image slices may also be used as dependent structure information for training CNN model 410.

Different types of dependent structure information may be selectively used based on various factors, such as the number of adjacent images in the stack, the types, shapes, sizes, positions, and/or numbers of the anatomical structures to be segmented, and/or the imaging modality used for obtaining the images. The use of such dependent structure information of stacks of adjacent 2D images obtained from a 3D image improves the accuracy for segmenting the 3D image or generating a 3D label map.

In some examples, convolutional neural network 424 of the CNN model 410 includes an input layer, e.g., stack of adjacent 2D images 422. Because a stack of adjacent 2D images are used as the input, the input layer has a volume, whose spatial dimensions are determined by the width and height of the 2D images, and whose depth is determined by the number of images in the stack. As described herein, the depth of the input layer of CNN model 410 can be desirably adjusted to match the number of images in input stack of adjacent 2D images 422.

In some embodiments, convolutional neural network 424 of the CNN model 410 includes one or more convolutional layers 428. Each convolutional layer 428 may have a plurality of parameters, such as the width ("W") and height ("H") determined by the upper input layer (e.g., the size of the input of convolutional layer 428), and the number of filters or kernels ("N") in the layer and their sizes. The number of filters may be referred to as the depth of the convolutional layer. Therefore, each convolutional layer 428 may be described in terms of a 3D volume. The input of each convolutional layover 428 is convolved with one filter across its width and height and produces a 2D activation map or feature map corresponding to that filter. The convolution is performed for all filters of each convolutional layer, and the resulting activation maps or feature maps are stacked along the depth dimension, generating a 3D output. The output of a preceding convolutional layer can be used as input to the next convolutional layer.

In some embodiments, convolutional neural network 424 of CNN model 410 includes one or more pooling layers (not shown). A pooling layer can be added between two successive convolutional layers 428 in CNN model 410. A pooling layer operates independently on every depth slice of the input (e.g., an activation map or feature map from a previous convolutional layer), and reduces its spatial dimension by performing a form of non-linear down-sampling. Additionally, information from a non-adjacent layer can "skip" intervening layers and can be aggregated in a pooling layer with other inputs. In an example, the function of the pooling layers may include progressively reducing a spatial dimension of the extracted activation maps or feature maps to reduce the amount of parameters and computation in the network, to control overfitting. The number and placement of the pooling layers may be determined based on various factors, such as the design of the convolutional network architecture, the size of the input, the size of convolutional layers 428, or application of CNN model 410.

Various non-linear functions can be used to implement the pooling layers. For example, max pooling may be used. Max pooling may partition an image slice of the input into a set of overlapping or non-overlapping sub-regions with a predetermined stride. For each sub-region, max pooling outputs a maximum value amongst corresponding sub-regions within the partition. This effectively downsamples every slice of the input along both its width and its height while the depth dimension remains unchanged. Other suitable functions may be used for implementing the pooling layers, such as average pooling or even L2-norm pooling.

In various embodiments, CNN model 410 may selectively include one or more additional layers in its convolutional neural network 424. As a non-limiting example, a Rectfied Linear Unit (ReLu) layer (not shown) or Parametric ReLU (PReLU) (not shown) may be selectively added after a convolutional layer to generate an intermediate activation map or feature map. For example, the ReLu layer may increase the nonlinear properties of the predictor function and the overall of CNN model 410 without affecting the respective dimensions of convolutional layers 428. Additionally, the ReLu layer may reduce or avoid saturation during a backpropagation training process.

As another non-limiting example, one or more fully connected layers 429 may be added after the convolutional layers and/or the pooling layers. The fully connected layers have a full connection with all activation maps or feature maps of the previous layer. For example, a fully connected layer may take the output of the last convolutional layer or the last pooling layer as the input in vector form, and perform high-level determination and output a feature vector arranged along the depth dimension. The output vector may be referred to as an output layer. The vector may contain information of the anatomical structures in input stack of images 422 of CNN model 410. Further, information from the output layer extracted from 2D imaging slices according to a 2D or "2.5D" CNN model can be used to identify a sub-region of 3D imaging data. Such output data from the CNN model 410 can also be used in concert with a 3D CNN applied to the sub-region.

In the second portion of CNN model 410, pixel-wise labeling may be performed using the one or more features extracted by convolutional neural network 424 as the input to generate a predicted 2D label map 432. The 2D label map may provide structure labels of the middle images of the stack of adjacent 2D images. In an example, the 2D label map may be used to automatically determine a sub-region of 3D imaging to which a second, 3D CNN model can be applied (e.g., in a cascading or linked manner). A patch-based approach may be used for predicting 2D label map 432 of middle image 426 of input stack of adjacent 2D images 422. Each image in the stack of adjacent 2D images may be similarly divided into overlapping or non-overlapping rectangular patches, each having a central pixel. This generates a stack of adjacent 2D image patches. A stack of 2D image patches can be used as both training data and input of CNN model 410. The patches may be designed such that the central pixels of the patches together substantially constitute a whole 2D image. CNN model 410 may classify the central pixel of a middle patch of each stack of patches, e.g., predicting the anatomical structure represented by the central pixel. For example, CNN model 410 may predict a feature vector of the central pixel of the middle patch in the stack, thereby allowing for classifying the anatomical structure of the central pixel. Such classification is performed repeatedly until all central pixels of the middle patches of all stacks of adjacent 2D image patches are classified or labeled, thereby achieving segmentation of the middle image of the stack of adjacent 2D images. For instance, in a patch-based approach, pixel-wise labeling of middle image 426 of input stack of adjacent 2D images 422 may be performed when all the central pixels constituting the whole middle image 426 are classified.

In the above-described patch-based approach, pixel-wise labeling of middle image 426 of input stack of adjacent 2D images 422 is performed when all the central pixels constituting the whole middle image 426 is classified.

In another example, a fully-mapped approach may be used for predicting 2D label map 432 of middle image 426 of input stack of adjacent 2D images 422. In such instances, 2D label map 432 of middle image 426 is generated as the output of CNN model 410 based on input stack of adjacent 2D images 422. The convolutional neural network 424 in CNN model 410 is used for extracting an activation map or a feature map as an output, which is received by a pixel-wise labeling structure that includes one or more operation layers to predict the 2D label map. In such instances, the final layer of convolutional neural network 424 may be a convolutional layer that outputs the activation map or feature map.

As a non-limiting example, a pixel-wise prediction layer (not shown) may be added to CNN model 410 to perform the pixel-wise labeling. The pixel-wise prediction layer converts a coarse output feature map (e.g., a feature vector) of convolutional neural network 424 to a dense (e.g., providing more information of each pixel) predicted pixel-wise 2D label map 432 of middle image 426 of input stack of adjacent 2D images 422. Various functions may be used to implement the pixel-wise prediction layer, such as backwards upsampling or unpooling (e.g., bilinear or nonlinear interpolation), and backwards convolution (deconvolution).

As another non-limiting example, a deconvolution network 434 can be used as a portion of the CNN model 410 to perform the pixel-wise labeling. The deconvolution network 434 may be a mirrored version of convolutional neural network 424 of CNN model 410. Contrary to the convolutional neural network 424 that progressively reduces the spatial dimensions of the extracted activation maps or feature maps, deconvolution network 434 enlarges the intermediate activation maps or feature maps by using a selection of deconvolutional layers 436 and/or unpooling layers (not shown). An unpooling layer (e.g., an upsampling layer) may be used to place the pixels in the feature maps back to their previous or original pool location, thereby generating an enlarged, yet sparse activation map or feature map. A deconvolutional layer may be used to associate a single pixel of an input activation map or feature map to multiple output pixels, thereby enlarging and increasing the density of the activation map or feature map. The deconvolution network 434 may be trained and used together with convolutional neural network 424 to predict a 2D label map.

As a further non-limiting example, a loss layer (not shown) may be included in CNN model 410. The loss layer may be the last layer in convolutional neural network 434 or CNN model 410. During the training of CNN model 410, the loss layer may determine how the network training penalizes the deviation between the predicted 2D label map and the 2D ground truth label map. The loss layer may be implemented by various suitable loss functions. For example, a cross-entropy loss function may be used as the final loss layer of CNN model 410.

Consistent with embodiments of the present disclosure, the image segmentation methods, systems, devices, and/or processes based on the above-described CNN models include two stages: a training stage that "trains" or "learns" the CNN model using training datasets that include images labeled with different anatomical structures for each voxel, and a segmentation stage that uses the trained CNN model to predict the anatomical structure of each voxel of an input 3D image (or pixel of an input 2D image) or label each voxel of an input 3D medical image (or pixel of an input 2D image) to an anatomical structure. The general structure of the convolutional neural network shown in FIG. 4 is also applicable to a 3D model, wherein a group of 3D images is provided rather than a stack of 2D images. The image segmentation methods, systems, devices, and/or processes which integrate these CNN models and other types of deep learning models into atlas-based segmentation workflows are described in detail below. Other variations to the type of deep learning model and other neural-network processing approaches may also be implemented with the present techniques.

Figure 5:
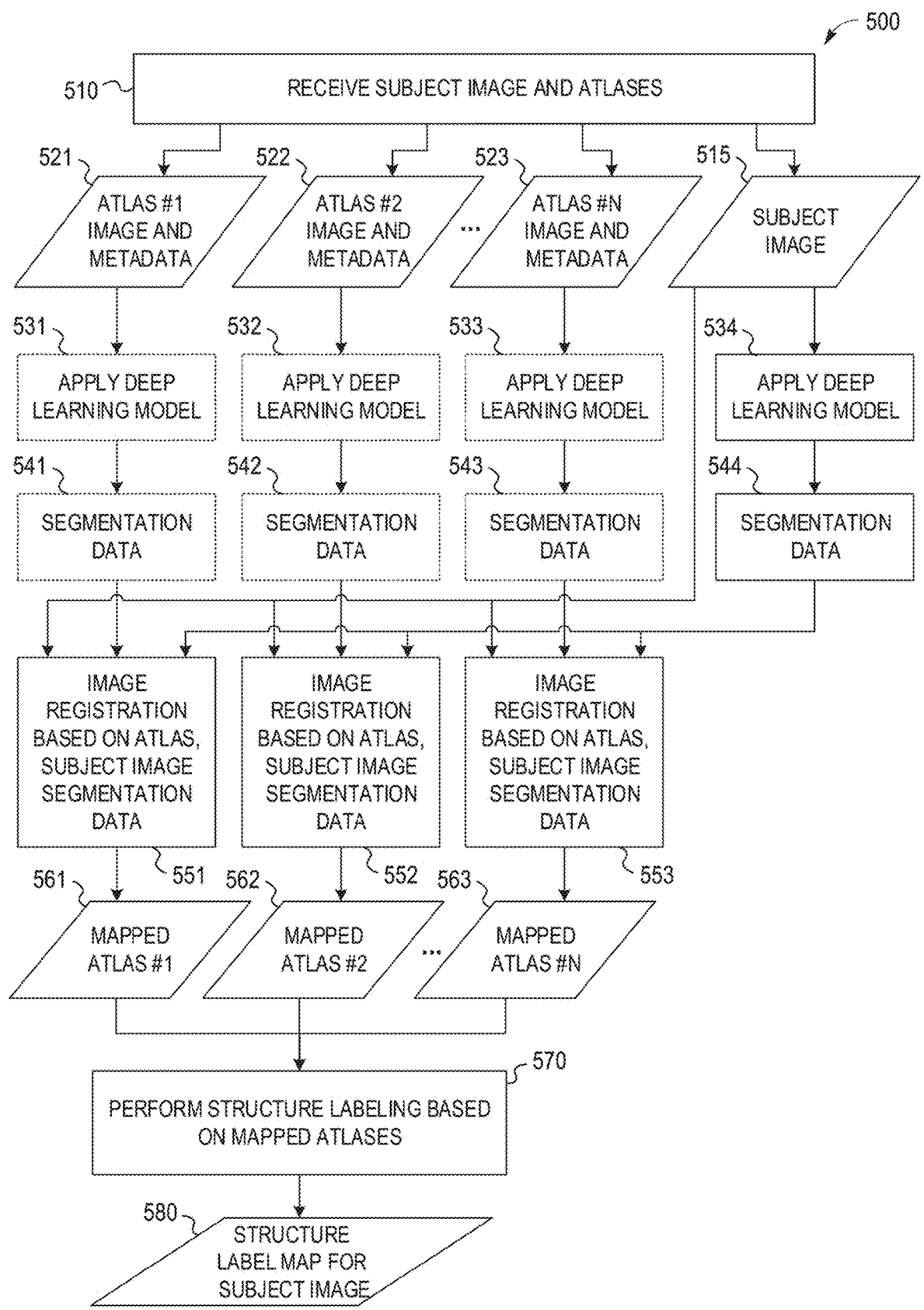
FIG. 5 illustrates an exemplary data flow in an atlas registration process adapted for use with deep learning segmentation data.

FIG. 5 illustrates an exemplary data flow 500 in an atlas registration process adapted for use with deep learning segmentation data. As is shown in the data flow, the atlas registration process is used with a plurality of atlases 521, 522, 523 (atlases 1, 2, . . . N) and associated atlas metadata, to implement aspects of an auto-segmentation process on a subject image 515. Specifically, the data flow 500 produces structure labeling of various pixels or voxels of the subject image 515 (operation 570) based on one to N mapped atlases (atlases 561, 562, 563); such structure labeling may be produced into a structure label map for a subject image (result 580). As discussed below, the data flow 500 may be considered an atlas-based auto-segmentation process modified to integrate data results of a deep learning model.

In an example, atlas-based auto-segmentation processes are used to perform segmentation of a subject image using one or multiple already-segmented images (e.g., from previously treated patients). These already-segmented images together with their annotations (e.g., metadata that indicates structure label maps, structure surfaces, or other delineations) are referred to as atlases. After aligning a new subject image to an atlas image through image matching, in a procedure referred to as image registration, structure labels defined on the atlas are mapped to a new subject image using the computed image transformation, which are then produced into structure labels and segmentation results for the subject image. The accuracy of an atlas-based auto-segmentation process can be improved with the use of multiple atlases. For instance, atlas segmentation is often updated in fractions as radiotherapy is performed at different sessions or times; the combination of multiple atlases produced from these different sessions or times can make the overall set of atlases very accurate for a particular patient. Further, the application and combination of multiple atlases to a new subject image can be performed in a very quick manner, but often occur at the expense of accuracy and precision if there are significant variations in the subject image.

The accuracy of an atlas-based auto-segmentation process depends heavily on atlas registration accuracy. However, atlas registration to a subject image can be a difficult problem when considering image data, because image information can be ambiguous to show different structures with similar or overlapping intensity distributions. The integration of deep learning results in the following examples provides additional ways of improving accuracy and precision to the application of the atlases in atlas registration. For instance, a deep learning model that is trained on a large set of training data can provide very accurate segmentation results for some of the same structures that are addressed during atlas registration. Thus, in the data flow 500, segmentation data 544 or other results from applying a deep learning model (operation 534) may be used to guide the image registration to the respective atlas images (in image registration operations 551, 552, 553), through structure-constrained deformable registration or like registration techniques.

The data flow in FIG. 5 specifically depicts the receipt of a subject image and atlases (operation 510), which corresponds to the plurality of atlas images and metadata annotations 521, 522, 523 and the subject image 515. In one branch of the data flow 500, a deep learning model that has been trained to identify anatomical structures or characteristics may be applied (operation 534) to produce segmentation data (result 544). In an example, the deep learning model may constitute a model trained to perform segmentation of 2D or 3D medical imaging data, as discussed with reference to the deep learning approaches referenced for FIGS. 3 and 4.

As shown, the segmentation results (predicted or output values) of the deep learning model are integrated into aspects of atlas image registration (in operations 551, 552, 553). The atlas image registration is configured to, as in a conventional atlas workflow, perform the atlas image registration based on atlas image data and associated atlas metadata (e.g., from atlases 521, 522, 523). In the data flow 500, however, the results of a deep learning segmentation model used on the subject image (result 544) (and, in some examples, results from using the deep learning model on the atlas images) are used to assist the atlas image registration (in image registration operations 551, 552, 553).

The application of a deep learning segmentation model may produce segmentation data 544 that identifies a subset of anatomical structures or features in the subject image 515. Such identified structures or features may be used to "seed" or "guide" the registration performed with an atlas image to the subject image. In an example, the image registration is performed on the subject image 515, and the deep learning-identified features affect the application of image registration operations with each of the one to N atlases (operations 551, 552, 553). For instance, the deep learning-identified features may produce an initial registration position, constraint, or mapping for a particular atlas image or atlas annotation to the subject image.

In a further (optional) example, deep learning segmentation data may be produced from each atlas image (data 521, 522, 523) and analyzed in another branch of the workflow prior to the image registration. For instance, the image data from each atlas image (data 521, 522, 523) may be applied in respective uses of the deep learning model (operations 531, 532, 533), to produce segmentation data (result 541, 542, 543). This segmentation data may be used to further assist the image registration and the classification or mapping of structures to the subject image.

The use of multiple atlas images and image registrations may assist the atlas-based auto-segmentation process by allowing variations in mapping among the 1 to N atlases. Thus, in an example, multiple mapped atlases (results 561, 562, 563) are produced from the image registration (operations 551, 552, 553). The data from the mapped atlases may be combined to produce structure labeling on respective areas and portions of the images (operation 570). The structure labeling produced from the multiple mapped atlases then may be produced into a structure label map for the subject image (result 580). For instance, the structure label map may provide an indication of various 2D pixel or 3D voxel areas that are classified to a structure of interest or not. In other examples, the data flow 500 may be modified for use with a single atlas, or the evaluation of multiple subject images with the deep learning model.

As an example scenario, the deep learning segmentation results can be directly used to compute an initial registration solution (e.g., a linear registration) to provide an improved starting point for computing the final atlas-subject image registration for various anatomical organs or structures. For example, consider a scenario where the deep learning model is a deep learning segmentation model that is trained on a large volume of data sets to identify an outline of a prostate. This deep learning segmentation model may be used to auto-segment the prostate from both the atlas image(s) and the new subject image. For instance, the prostate segmentation results from the deep learning model can be used to compute a linear transformation that aligns the prostate of an atlas to the prostate of the subject. In this manner, the deep learning model provides a starting point that is used to improve the accuracy of the final image registration results of the atlases with non-linear or deformable registration.

Thus, in the data flow 500, the deep learning model (applied in operation 534, or in optional operations 531, 532, 533) only affects the final atlas-based auto-segmentation results through its influence on the atlas-registration step. This addresses two significant limitations of exclusively using a deep learning or other machine learning model to produce final segmentation results. First, a deep learning model may not have all structures needed for the new image, especially since a deep learning model is usually pre-trained at a previous point in time, using a large set of training data. The training data may be available to pre-train the model for a subset of structures, e.g., a prostate/bladder/rectum, whereas a new user or medical facility may need to segment additional structures such as the neurovascular bundles. With the present techniques, a deep learning model may be used to provide very accurate segmentation of a particular organ or subset of organs, while atlases are used to segment or estimate the remaining structures. Second, the deep learning model may be trained using data from a different clinic whose contouring protocol is different from the new image data to be segmented. With the present techniques, the deep learning model may be applied to segment the structures in the model for both the atlases and the new subject image to make sure the segmentation results for these structures are consistent across the atlases and the subject.

Accordingly, deep learning segmentation results may be used to improve the atlas registration in the atlas-based auto-segmentation data flow 500 or other variations of atlas-based segmentation. However, the final segmentation results for structures in the subject image are still obtained through the conventional atlas-structure warping and label fusion/refinement procedures defined for the atlas-based segmentation. Restated, the deep learning-assisted image registration result can be considered to "warp" or adapt the atlas structures to the new subject image. Because such atlases in the atlas-based auto-segmentation data flow are typically specific to the user or medical facility, the desired contouring protocol and other specific characteristics of the atlas may remain in use and consistent with the new segmentation task.

Figure 6:
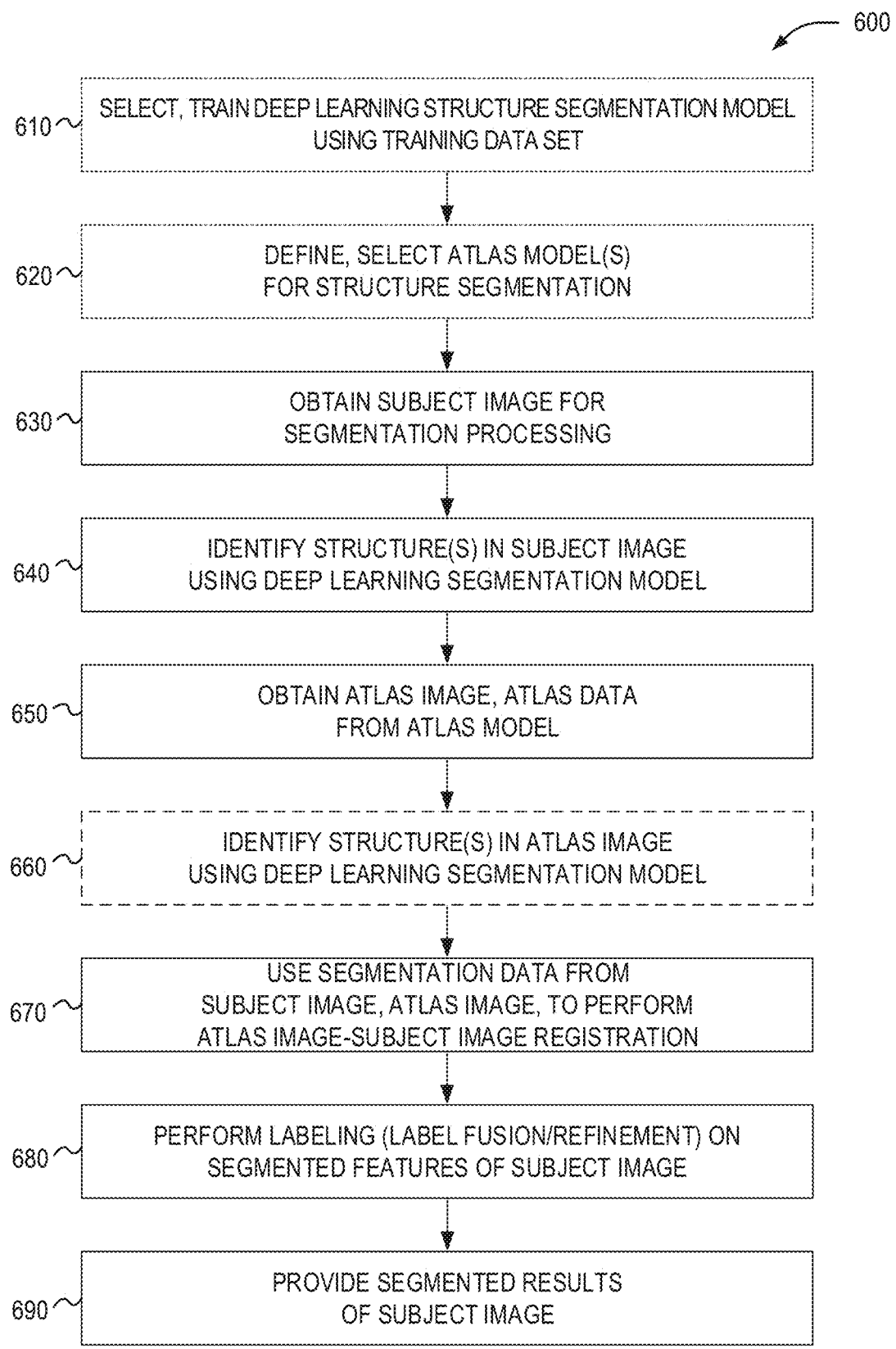
FIG. 6 illustrates a flowchart of exemplary operations for performing deep learning assisted atlas-based segmentation.

FIG. 6 illustrates a process flow 600 of exemplary operations for performing deep learning-assisted atlas-based segmentation. The process flow 600 is illustrated from the perspective of an image processing system which receives and processes data using the results of deep learning as integrated into an atlas-based auto-segmentation procedure. However, corresponding operations may be performed by other devices or systems.

The process flow 600 depicts optional preconditions for the deep learning-assisted atlas-based segmentation workflow, which may be performed at an earlier time, by another entity, user, or medical facility, or in another setting. These preconditions are depicted as including the selection and training of a deep learning structure segmentation model, using a training data set (operation 610), and the definition and selection of one or more atlas models for structure segmentation (operation 620). For instance, the deep learning structure segmentation model may be trained or structured based on the aspects of deep learning and CNNs referenced above in FIGS. 3 and 4. The atlas models may be designed or structured based on manually or automatically segmented images and annotations (e.g., structure label maps or structure surfaces) on such segmentation images; in some examples, the atlas models may be created in connection with radiotherapy treatment workflows.

The process flow 600 continues with segmentation operations performed on a subject medical image by application of the deep learning model. These operations include obtaining a subject image for segmentation processing (operation 630), and performing the branch of the segmentation workflow to identify one or more structures in the subject image using the deep learning segmentation model (operation 640). For instance, the deep learning segmentation model may produce an identification of a classification, structure, feature, or other identification of pixel or voxels, pixel or voxel areas, or like image portions.

The process flow 600 continues segmentation operations performed on a subject medical image with deep-learning enhanced atlas registration techniques. These operations include obtaining an atlas image and atlas data (e.g., annotations or other metadata) from an atlas model (operation 650), and applying the segmentation data of the subject image from the deep learning model to perform or assist with atlas image-subject image registration (operation 670). Such atlas registration may involve adapting or warping the atlas image to the subject, to generate a segmentation result (e.g., a structure label map or structure contours/surfaces) on the subject image. In a further (optional) example, additional segmentation data used in the image registration is produced from identifying one or more structures or features in the atlas images using the deep learning segmentation model (operation 660). Although only one atlas is depicted within some elements within the process flow 600, it will be understood that parallel or sequential operations may perform the segmentation workflow on multiple atlases (with operations 650, 660, 670 applying to one or multiple atlases).

The process flow 600 continues with operations to perform labeling (including label fusion and refinement) on the subject image (operation 680). This labeling may include the incorporation of registered images from multiple atlases, the incorporation of segmentation and labeling features from additional artificial intelligence (e.g., machine learning) algorithms, and the like. Label fusion may combine the warped atlas segmentation (structure label maps or structure contours/surfaces) to produce the structure segmentation of the subject image. Further examples of label fusion and refinement with data produced by a trained machine learning model are discussed below with reference to FIGS. 7 to 9. Finally, the process flow 600 concludes by providing the segmented results of the subject image. This providing may be in the form of generating metadata or image data annotations, outputting results in a graphical user interface, defining or associating a classification of one or more anatomical structures of interest, generating a label map or structure label estimates, generating contours or surfaces for each structure, storing or communicating an indication of the segmentation, modifying a treatment plan, defining areas of treatment or exclusion from treatment (including delineation of OARs), or the like.

In a further example, atlas-based auto-segmentation labeling methods may include the use of machine learning methods which are enhanced by deep learning. For example, random forests (RF), support vector machine (SVM), Boosted Tree (BT), or like classifier models may be used to train a pixel- or voxel-based structure classifier that can improve atlas-based auto-segmentation segmentation accuracy. The use of machine learning methods with previous atlas-based auto-segmentation labeling methods, however, often involved the use of manually-specified image features that serve as inputs to the machine learning model to predict the structure label for each image pixel or voxel. In the following non-limiting examples, deep learning model results may be provided as additional input to train or refine applicable image features of a machine learning classifier. Such deep learning model results may include a deep learning segmentation result (e.g., the final result when applying a deep learning model), or additionally, the intermediate results produced from operation of the deep learning model.

In an example, a deep learning segmentation model that utilizes CNN has the ability to automatically learn a hierarchy of image features from training images. As a result, when a CNN model is applied to a new subject image to compute the segmentation result, this model involves first extracting a sequence of image features and then converting the features into segmentation maps or segmentation probabilities. The output of each convolutional layer of a CNN model is often referred to as a "feature map". In an example, these feature maps or like outputs from the layers inside a CNN or other deep learning model may be extracted as features for training a machine learning classifier used for image labeling. For instance, as is illustrated in FIG. 4, a deep learning model may produce many immediate outputs (feature maps) from the middle layers of the CNN model when analyzing a subject image. Each feature map is a multi-channel image that can be used as an additional input to train the machine learning model.

Accordingly, in an example, deep learning model segmentation results may be used as additional input to an online or offline machine learning model (e.g., BT, RF, or SVM, or other machine learning classifiers) to assist or compliment an atlas-based auto-segmentation workflow (e.g., the data flow 500 or the process flow 600). For example, a deep learning segmentation label map may be used as an additional channel with respect to the original image data, and used to train a multi-channel image pixel- or voxel-classification model (e.g., BT, RF, or SVM or other machine learning classifiers).

In a further example, a transformation of the deep learning segmentation label map may be computed and used as another input channel to extract features for a machine learning classifier model. For example, a distance transform of the segmentation map may be computed using such features, in many settings, the distance from a particular structure may provide valuable information (e.g., the distance from the prostate region may assist a decision on whether a voxel belongs to bladder or not).

Figure 7:
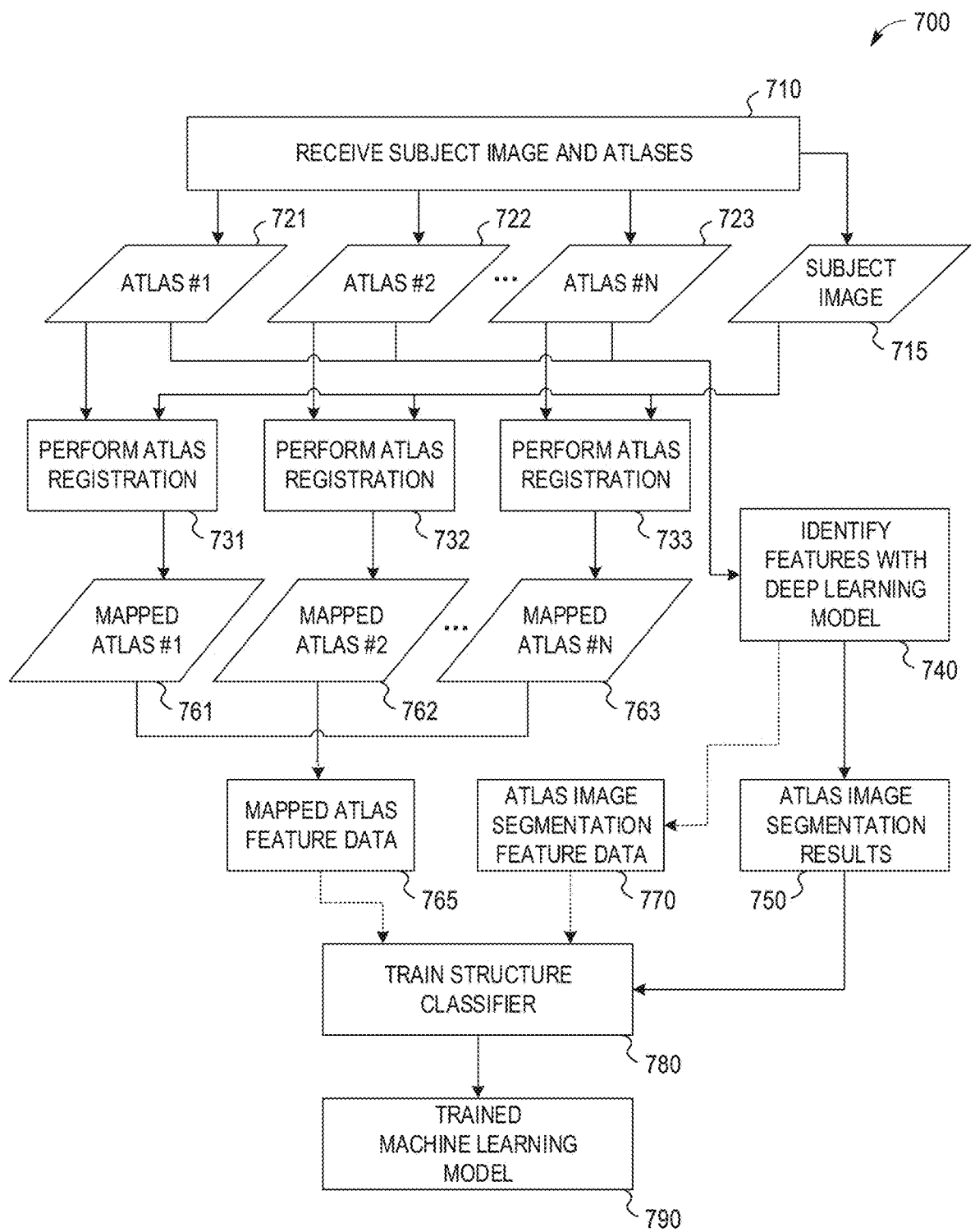
FIG. 7 illustrates an exemplary data flow in a machine learning model training process adapted for use with deep learning segmentation feature data.

FIG. 7 illustrates an exemplary data flow 700 in a machine learning model training process adapted for use with deep learning segmentation feature data. The data flow 700 provides a simplified representation of some of the operations performed in data flow 500, including the receipt of a subject image 715 and 1 to N atlases 721, 722, 723 (operation 710), and the performance of atlas registrations (operations 731, 732, 733) on the 1 to N atlases 721, 722, 723 to produce mapped atlases 761, 762, 763. However, the atlas registration operations are optional; the machine learning model may be trained based solely on the original atlas data 721, 722, 723 and the outputs of applying the deep learning model to each atlas image as discussed below. Additionally, although not depicted, the atlas registrations (operations 731, 732, 733) may be assisted by the application of a deep learning segmentation model (e.g., as depicted in FIG. 5).

The data flow 700, however, more specifically illustrates the results of training of a machine learning structure classifier (operation 780) using atlas image data, to produce a trained machine learning model 790 usable in segmentation labeling and feature representations. (The integration of this trained machine learning model into a segmentation process is depicted in more detail in the data flow of FIG. 8.) In the data flow 700, the machine learning model 790 is shown as being trained from atlas image segmentation results 750 produced by a deep learning model that analyzes the atlas images, the machine learning model 790 is shown in optional examples as being additionally trained from mapped atlas feature data 765 or atlas image segmentation feature data 770.

Specifically, each atlas image 721, 722, 723 is analyzed by the deep learning model 740 to extract a segmentation result (data 750), in addition to a sequence of segmentation features of the atlas image (data 770) from the various layers of the deep learning model. The segmentation data 750, 770 is provided as training input to the machine learning model classifier and used in the training phase (operation 780). For every original atlas image, ground truth may be determined from the atlas data itself; feature information for the original atlas image or a mapped atlas image thus may be used to train a machine learning classifier that produces a classification. Thus, in contrast with conventional techniques where a machine learning classifier is trained from manual feature definitions in terms of gradients, lines, or textures, output data from applying a deep learning model automatically provides a set of features that are relevant for anatomical structures to be classified.

Other aspects of training data used in machine learning training (e.g., in prior machine-learning-assisted atlas-based segmentation processes) may be optionally integrated or used as training input to the machine learning model classifier. For instance, feature data (data 765) provided from the various mapped atlases 761, 762, 763, produced from image registration to the subject image 715, may be combined with, supplement, or replace features that train the structure classifier in the training phase (operation 780). In a similar fashion, metadata or other feature data provided from the original atlases 721, 722, 723 may be combined with, supplement, or replace features that train the structure classifier in the training phase (operation 780).

Figure 8:
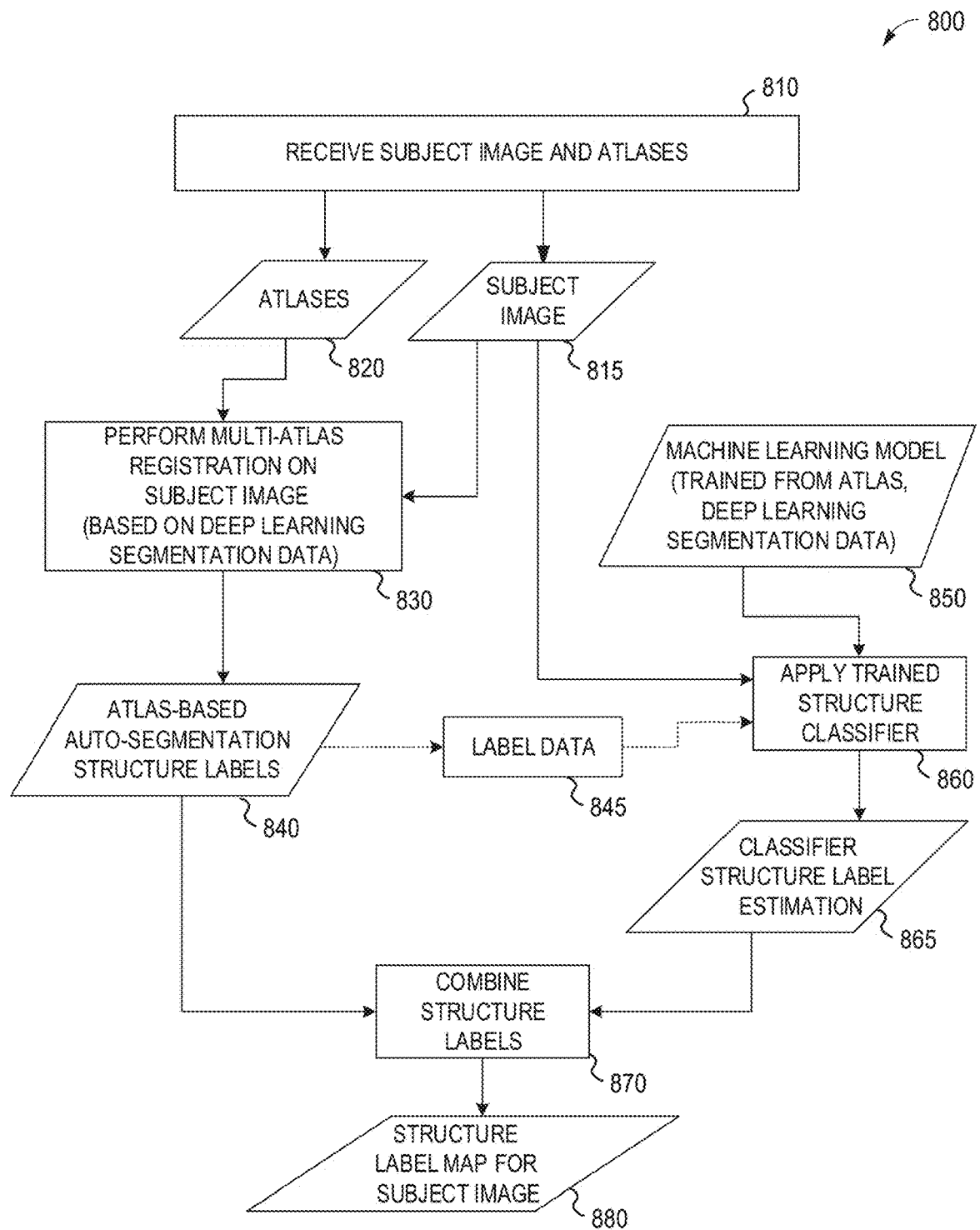
FIG. 8 illustrates an exemplary data flow in a machine learning model classification process adapted for use with deep learning segmentation feature data.

FIG. 8 illustrates an exemplar) data flow 800 in a machine learning model classification process adapted for use with deep learning segmentation feature data. The data flow 800 specifically indicates the use of a machine learning model 850, trained from atlas or deep learning segmentation feature data. For instance, the machine learning model 850 may be trained in the same fashion as machine learning model 790 as illustrated in FIG. 7.

The data flow 800 also provides a simplified representation of some of the operations performed in data flow 500, including the receipt of a subject image 815 and multiple atlases 820, and the performance of atlas registrations (operation 830) on the multiple atlases 820 and the subject image 815 to produce atlas-based structure labels 840. Although not depicted, the atlas registrations (operation 830) may be assisted by the application of a deep learning segmentation model (e.g., as depicted in FIG. 5).

The data flow 800 further illustrates with the integration (e.g., fusion) of structure labels (e.g., labels 840) produced from the atlas-based segmentation operations on a subject image 815 and structure labels produced from application of a machine learning model 850 to the subject image 815. Specifically, the branch of the data flow 800 illustrates the application of the trained structure classifier (operation 860) to the subject image 815, to produce a classifier-based structure label estimation 865 for the subject image. The application of the classifier-trained structure classifier (operation 860), in an optional example, may also utilize label data 845 produced from the atlas-based segmentation operations or atlas-based structure labels.

The classifier structure label estimation 865, produced from the machine learning structure classifier, may be combined with the atlas-based structure labels 840 (operation 870), and used to produce a structure label map 880 for the subject image. Any number of label fusion or combination techniques may be used to combine the segmentation label results. Accordingly, the structure label map 580 produced from the data flow 500 of FIG. 5 may be substituted with the machine-learning-enhanced structure label map 880.

Figure 9:
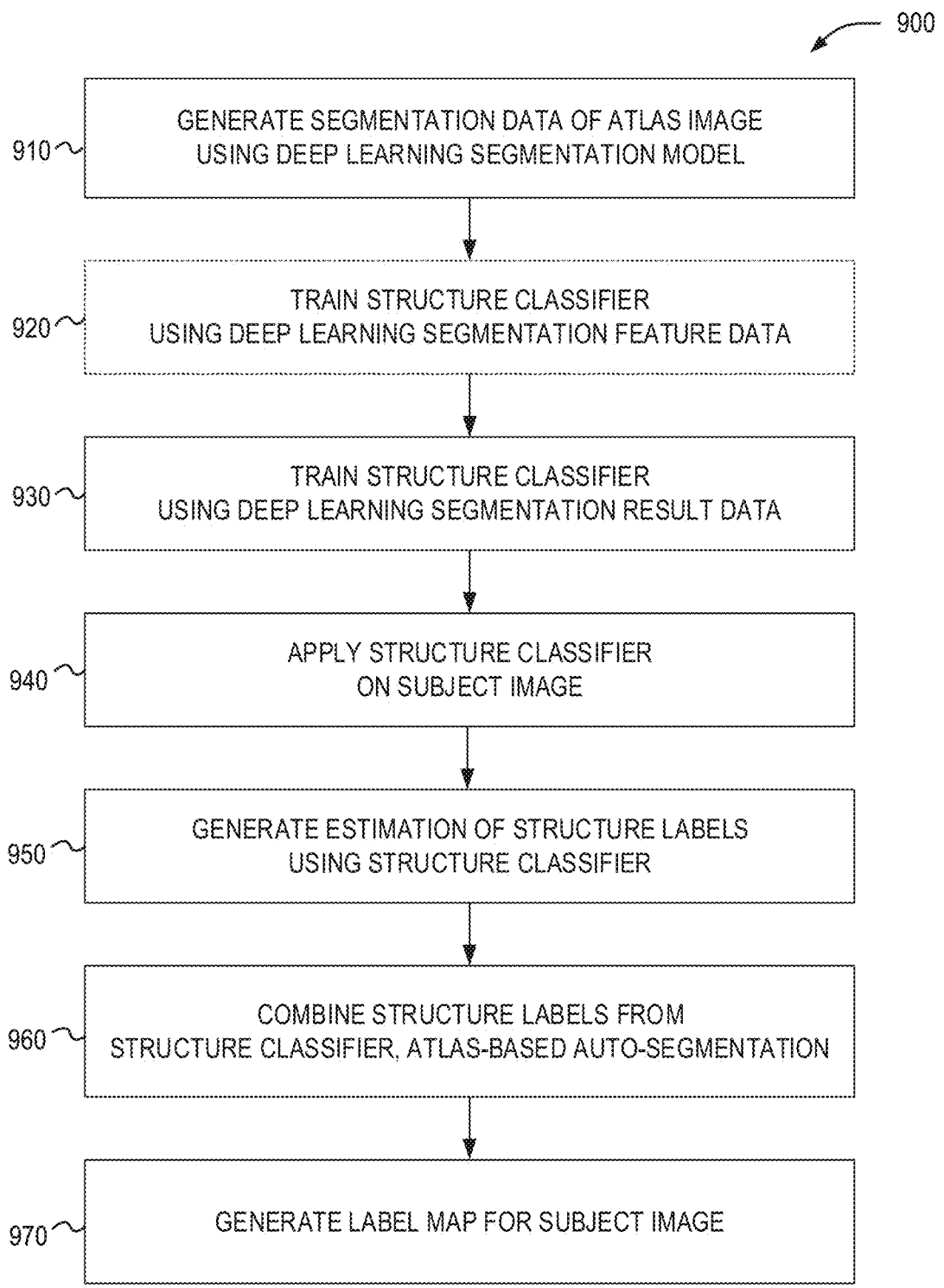
FIG. 9 illustrates a flowchart of exemplary operations for performing deep learning assisted atlas-based segmentation with use of a machine learning classifier.

FIG. 9 illustrates a process flow 900 of exemplary operations for performing deep learning assisted atlas-based segmentation with use of a machine learning classifier. The process flow 900 is also illustrated from the perspective of an image processing system which trains and utilizes a machine learning structure classifier, using the results of deep learning as integrated into an atlas-based auto-segmentation procedure. However, corresponding operations may be performed by other devices or systems (including in offline training settings outside of an atlas-based segmentation workflow).

The process flow 900 depicts the generation of segmentation feature data of an atlas image, using a deep learning segmentation model (operation 910). Such segmentation feature data may include a sequence of image features extracted with a CNN model, and/or the final CNN segmentation maps or segmentation probabilities produced from the CNN model. This segmentation data is used to train a machine learning structure classifier, such as with training based on deep learning segmentation feature data (e.g., feature maps) (operation 920), and training based on deep learning segmentation result data (operation 930), to produce the machine learning classifier models (e.g., RF, SVM, BT) discussed above.

The trained structure classifier is applied to the subject image (operation 940), and used to generate an estimate of the structure labels using the structure classifier (operation 950). The output from the machine learning model may include classification labels, probabilities, or other forms of classification data that indicates a structure, feature, or other indication respective pixels, voxels or areas of the subject image (or a set of subject images). The structure label information that is produced from the machine learning model may be combined (e.g., fused, integrated, joined) with structure label information from an atlas-based auto-segmentation process (operation 960), including a deep-learning-assisted atlas-based segmentation process as discussed with reference to FIGS. 5 and 6. (In other examples, the structure label information may be combined with information from a conventional atlas-based segmentation process that does not involve deep learning). Finally, the process flow concludes with the generation of a label map for the subject image (operation 970). The output of the label map may be provided as discussed above with reference to an output of the segmented results (e.g., with operation 690).

As previously discussed, respective electronic computing systems or devices may implement one or more of the methods or functional operations as discussed herein. In one or more embodiments, the image processing computing system 110 may be configured, adapted, or used to control or operate the image-guided radiation therapy device 202, perform or implement the deep learning training or prediction operations 308, 312, operate the CNN model 410, perform or implement the data flows 500, 700, 800, perform or implement the operations of the flowcharts 600, 900, or perform any one or more of the other methodologies discussed herein (e.g., as part of segmentation processing logic 120 and the segmentation workflow 130). In various embodiments, such electronic computing systems or devices operates as a standalone device or may be connected (e.g., networked) to other machines. For instance, such computing systems or devices may operate in the capacity of a server or a client machine in server-client network environment, or as a peer machine in a peer-to-peer (or distributed) network environment. Features of computing systems or devices 110 may be embodied by a personal computer (PC), a tablet PC, a Personal Digital Assistant (PDA), a cellular telephone, a web appliance, or any machine capable of executing instructions (sequential or otherwise) that specify actions to be taken by that machine.

As also indicated above, the functionality discussed above may be implemented by instructions, logic, or other information storage on a machine readable medium. While the machine-readable medium may have been described in various examples with reference to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions.

ADDITIONAL NOTES

The above detailed description includes references to the accompanying drawings, which form a part of the detailed description. The drawings show, by way of illustration but not by way of limitation, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a," "an," "the," and "said" are used when introducing elements of aspects of the invention or in the embodiments thereof, as is common in patent documents, to include one or more than one or more of the elements, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "comprising," "including," and "having" are intended to be open-ended to mean that there may be additional elements other than the listed elements, such that after such a term (e.g., comprising, including, having) in a claim are still deemed to fall within the scope of that claim. Moreover, in the following claims, the terms "first," "second." and "third," etc., are used merely as labels, and are not intended to impose numerical requirements on their objects.

The present invention also relates to a computing system adapted, configured, or operated for performing the operations herein. This system may be specially constructed for the required purposes, or it may comprise a general purpose computer selectively activated or reconfigured by a computer program (e.g., instructions, code, etc.) stored in the computer. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In view of the above, it will be seen that the several objects of the invention are achieved and other advantageous results attained. Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The above description is intended to be illustrative, and not restrictive. For example, the above-described examples (or one or more aspects thereof) may be used in combination with each other. In addition, many modifications may be made to adapt a particular situation or material to the teachings of the invention without departing from its scope. While the dimensions, types of materials and example parameters, functions, and implementations described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A computer implemented method for performing atlas-based segmentation using deep learning, the method comprising:
   applying a deep learning model to identify one or more segmented anatomical features from a subject image, the deep learning model trained to generate deep learning segmentation data that identifies a first arrangement of the segmented anatomical features in the subject image, wherein the deep learning model comprises a convolutional neural network having a plurality of layers;
   registering an atlas image to the subject image with an atlas registration process, the atlas image being associated with annotation data that identifies the segmented anatomical features in the atlas image, wherein the atlas registration process comprises:
      producing an atlas registration result from image registration between the atlas image and the subject image, the atlas registration result produced from an aligning of the atlas image that identifies a second arrangement of the segmented anatomical features in the subject image; and
      using one or more of the first arrangement of the segmented anatomical features identified in the generated deep learning segmentation data to modify the second arrangement of the segmented anatomical features and improve the atlas registration result;
   generating a mapped atlas from registering the atlas image to the subject image; and
   identifying the segmented anatomical features in the subject image using the mapped atlas.

2. The method of claim 1, wherein the registering improves the atlas registration result between the atlas image and the subject image by applying the generated deep learning segmentation data to determine an initial registration estimation or a constraint based on the segmented anatomical features identified in the subject image.

3. The method of claim 1, wherein the atlas image is one of a plurality of atlas images, and wherein the mapped atlas is one of a plurality of mapped atlases, the method further comprising:
   registering the plurality of atlas images to the subject image with the atlas registration process, the plurality of atlas images associated with respective annotation data that identifies the segmented anatomical features in the respective atlas images of the plurality of atlas images, wherein the atlas registration process produces multiple registration results between the respective atlas images of the plurality of atlas images and the subject image, and wherein the registering uses the generated deep learning segmentation data to improve the multiple registration results; and
   generating the plurality of mapped atlases from the registering of the plurality of atlas images to the subject image, the plurality of mapped atlases identifying respective positions and boundaries of the segmented anatomical features in the multiple registration results for the subject image;
   wherein identifying the segmented anatomical features in the subject image comprises combining results from the plurality of mapped atlases.

4. The method of claim 3, wherein the segmented anatomical features includes a plurality of anatomical features, and wherein identifying the segmented anatomical features in the subject image, from the plurality of mapped atlases, further comprises:
   performing structure labeling of the plurality of anatomical features in the subject image based on the plurality of mapped atlases; and
   generating a structure label map for the subject image based on the structure labeling of the plurality of anatomical features.

5. The method of claim 1, further comprising:
   applying the deep learning model to the atlas image, the deep learning model trained to generate additional deep learning segmentation data that identifies the segmented anatomical features in the atlas image;
   wherein registering the atlas image to the subject image with the atlas registration process further comprises using the additional deep learning segmentation data, and wherein the additional deep learning segmentation data is further used to improve the atlas registration result of the segmented anatomical features identified between the atlas image and the subject image.

6. The method of claim 1, further comprising:
   applying a machine learning model to the subject image, the machine learning model trained based on feature data obtained from a layer of the plurality of layers in the convolutional neural network provided by the deep learning model, wherein the machine learning model is separate from the deep learning model, and wherein the machine learning model provides a structure classifier to indicate a predicted classification of anatomical structures; and
   generating classifier structure labels of the subject image from the predicted classification of anatomical structures;
   wherein identifying the segmented anatomical features comprises combining the structure labels from the atlas-based segmentation and the classifier structure labels from the machine learning model to identify a structure label map for the subject image.

7. The method of claim 6, wherein the machine learning model is a boosted tree (BT), random forest (RF) or support vector machine (SVM) classifier.

8. The method of claim 6, wherein the machine learning model is further trained based on at least one of: atlas feature data from the atlas image, mapped atlas feature data produced from the mapping of the atlas image, or transformation of a segmentation label map obtained from a layer of the deep learning model.

9. The method of claim 1, wherein the segmented anatomical features are segmented from a 3D image set, and wherein the deep learning model is trained based on a plurality of medical images that classify respective voxels of the segmented anatomical features in a segmentation label map.

10. The method of claim 9, wherein the plurality of medical images used to train the deep learning model include images from respective medical facilities, wherein the respective medical facilities utilize variations in imaging and contouring protocols to identify the segmented anatomical features in the plurality of medical images.

11. The method of claim 1, wherein the first arrangement of the segmented anatomical features identified in the generated deep learning segmentation data differs from the second arrangement of the segmented anatomical features produced from aligning of the atlas image.

12. A computer-implemented method for operating a trained machine learning classifier, in an atlas-based segmentation process using deep learning, the method comprising:

applying a deep learning model to an atlas image, the deep learning model adapted to generate data from analyzing a plurality of anatomical structures in the atlas image, wherein the deep learning model comprises a convolutional neural network having a plurality of layers;

training a machine learning model classifier, using the data generated from feature data obtained from a layer of the plurality of layers in the convolutional neural network, the feature data produced from applying the deep learning model to the atlas image, and the machine learning model classifier trained to classify the anatomical structures in the atlas image, wherein the machine learning model classifier is separate from the deep learning model;

applying the trained machine learning model classifier to identify one or more segmented anatomical features from a subject image, to produce classifications of respective areas of the subject image;

estimating structure labels of the respective areas of the subject image based on the classifications of the respective areas of the subject image; and defining structure labels of the respective areas of the subject image, by combining the estimated structure labels, with structure labels produced from an atlas-based segmentation on the subject image, the estimated structure labels providing a first arrangement of the segmented anatomical features in the subject image produced from applying the trained machine learning model classifier to the subject image, and the estimated structure labels providing a second arrangement of the segmented anatomical features in the subject image produced from applying the atlas-based segmentation to the subject image.

13. The method of claim 12, wherein the deep learning model is trained to perform segmentation of an input image, and wherein the data generated from applying the deep learning model comprises a feature map produced from analyzing the input image in an intermediate convolution layer of the convolutional neural network.

14. The method of claim 12, wherein the atlas image is one of a plurality of atlas images, the method further comprising performing the atlas-based segmentation on the subject image, by:

registering a plurality of atlas images to the subject image, using segmentation data produced from applying the deep learning model to the subject image;

generating a plurality of mapped atlases on the subject image, based on registering the plurality of atlas images to the subject image; and producing the structure labels of the subject image from the plurality of mapped atlases.

15. The method of claim 14, wherein producing the structure labels of the subject image from the plurality of mapped atlases comprises performing label refinement and label fusion for a plurality of labels indicated from the plurality of mapped atlases.

16. The method of claim 12, wherein the atlas image is one of a plurality of atlas images, and wherein training the machine learning model classifier is further performed using segmentation results produced from applying the deep learning model to the plurality of atlas images.

17. The method of claim 12, wherein the atlas image is one of a plurality of atlas images, and wherein training the machine learning model classifier is further performed using segmentation feature data produced from applying the deep learning model to the plurality of atlas images.

18. The method of claim 12, further comprising:

generating a label map of the subject image, from the structure labels of the respective areas of the subject image, the label map identifying respective segments of the subject image, wherein the respective areas of the subject image comprise respective structure labels corresponding to a plurality of voxels.

19. A system for performing atlas-based segmentation using deep learning, the system comprising:

processing circuitry comprising at least one processor; and a storage medium comprising instructions, which when executed by the at least one processor, cause the processor to:

obtain a subject image;

apply a deep learning model to identify one or more segmented anatomical features from the subject image, the deep learning model trained to generate deep learning segmentation data that identifies a first arrangement of the segmented anatomical features in the subject image, wherein the deep learning model comprises a convolutional neural network having a plurality of layers;

perform registering of an atlas image to the subject image with an atlas registration process, the atlas image being associated with annotation data that identifies the segmented anatomical features in the atlas image, wherein the atlas registration process comprises operations which:

produces an atlas registration result from image registration between the atlas image and the subject image, the atlas registration result produced from an aligning of the atlas image that identifies a second arrangement of the segmented anatomical features in the subject image; and uses one or more of the first arrangement of the segmented anatomical features identified in the generated deep learning segmentation data to modify the second arrangement of the segmented anatomical features and improve the atlas registration result;

generate a mapped atlas from the registering of the atlas image to the subject image; and perform identification of the segmented anatomical feature in the subject image using the mapped atlas.

20. The system of claim 19, wherein the registering improves the atlas registration result between the atlas image and the subject image by applying the generated deep learning segmentation data to determine an initial registration estimation or a constraint based on the segmented anatomical features identified in the subject image.

21. The system of claim 19, wherein the atlas image is one of a plurality of atlas images, and wherein the mapped atlas is one of a plurality of mapped atlases, wherein the instructions further cause the processor to:

register the plurality of atlas images to the subject image with the atlas registration process, using the generated deep learning segmentation data, the plurality of atlas images associated with respective annotation data that identifies the segmented anatomical features in the respective atlas images of the plurality of atlas images, wherein the atlas registration process produces multiple registration results between the respective atlas images of the plurality of atlas images and the subject image, and wherein the registering uses the generated deep learning segmentation data to improve the multiple registration results; and generate the plurality of mapped atlases from registration of the plurality of atlas images to the subject image, the plurality of mapped atlases adapted to identify respective positions and boundaries of the segmented anatomical features in the multiple registration results for the subject image;

wherein identification of the segmented anatomical features in the subject image comprises combining results from the plurality of mapped atlases.

22. The system of claim 21, wherein the segmented anatomical features includes a plurality of anatomical features, and wherein identification of the segmented anatomical features in the subject image, from the plurality of mapped atlases, causes the processor to:

perform structure labeling of the plurality of anatomical features in the subject image based on the plurality of mapped atlases; and generate a structure label map for the subject image based on the structure labeling of the plurality of anatomical features.

23. The system of claim 19, wherein the instructions further cause the processor to:

apply the deep learning model to the atlas image, the deep learning model trained to generate additional deep learning segmentation data that identifies the segmented anatomical features in the atlas image;

wherein registration of the atlas image to the subject image with the atlas registration process further comprises using the additional deep learning segmentation data, and wherein the additional deep learning segmentation data is additionally used to improve the registration result of the segmented anatomical features between the atlas image and the subject image.

24. The system of claim 19, wherein the instructions further cause the processor to:

apply a machine learning model to the subject image, the machine learning model trained based on feature data obtained from a layer of the plurality of layers in the convolutional neural network provided by the deep learning model, wherein the machine learning model is separate from the deep learning model, and wherein the machine learning model provides a structure classifier to indicate a predicted classification of anatomical structures; and generate classifier structure labels of the subject image from the predicted classification of anatomical structures;

wherein identification of the segmented anatomical features comprises a combination of the structure labels from the atlas-based segmentation and the classifier structure labels from the machine learning model to identify a structure label map for the subject image; and wherein the machine learning model is a boosted tree (BT), random forest (RF) or support vector machine (SVM) classifier.

25. The system of claim 19, wherein the deep learning model is trained based on a plurality of medical images that classify respective voxels of the segmented anatomical features in a segmentation label map, wherein the plurality of medical images used to train the deep learning model include images from respective medical facilities, and wherein the respective medical facilities utilize variations in imaging and contouring protocols to identify the segmented anatomical features in the plurality of medical images.

26. The system of claim 19, wherein the first arrangement of the segmented anatomical features identified in the generated deep learning segmentation data differs from the second arrangement of the segmented anatomical features produced from aligning of the atlas image.

* * * * *